(12) United States Patent
Schultz

(10) Patent No.: US 6,951,451 B2
(45) Date of Patent: Oct. 4, 2005

(54) RECIPROCATING HEAD PRESS

(75) Inventor: James L. Schultz, Palos Heights, IL (US)

(73) Assignee: AM Manufacturing Co.,, Dolton, IL (US)

( * ) Notice: Subject to any disclaimer, the term of this patent is extended or adjusted under 35 U.S.C. 154(b) by 176 days.

(21) Appl. No.: 10/630,200

(22) Filed: Jul. 30, 2003

(65) Prior Publication Data

US 2004/0241267 A1 Dec. 2, 2004

Related U.S. Application Data

(60) Provisional application No. 60/400,169, filed on Aug. 1, 2002.

(51) Int. Cl.[7] .............................. A21C 9/08; A21C 11/00
(52) U.S. Cl. .......................... 425/145; 99/353; 425/193; 425/364 R; 425/397
(58) Field of Search ................................. 425/145, 169, 425/193, 364 R, 397; 99/334, 349, 353

(56) References Cited

U.S. PATENT DOCUMENTS

| | | | | |
|---|---|---|---|---|
| 3,565,015 A | * | 2/1971 | Jorgensen ................ | 425/364 R |
| 4,668,524 A | * | 5/1987 | Kirkpatrick ............. | 425/364 R |
| 4,938,126 A | * | 7/1990 | Rubio et al. ................... | 99/349 |
| 5,006,358 A | * | 4/1991 | Ribio et al. .................. | 426/496 |
| 5,088,912 A | * | 2/1992 | Raque et al. ............ | 425/364 R |
| 5,231,919 A | * | 8/1993 | Lawrence et al. ....... | 425/364 R |
| 5,388,503 A | * | 2/1995 | Buerkle ........................ | 99/349 |
| 6,112,647 A | * | 9/2000 | Brunner et al. ................ | 99/349 |

* cited by examiner

Primary Examiner—James P. Mackey
(74) Attorney, Agent, or Firm—Sonnenschein Nath & Rosenthal, LLP

(57) ABSTRACT

A press for flattening dough pieces is provided having a floor supported frame, an endless conveyor belt movably carried on the frame and presenting an upper horizontal surface, and at least one movable platen carried on the frame for pressing the dough pieces against the belt. In an embodiment, a sub frame is adjustably supported by the frame to permit leveling and adjustment of said sub frame relative to the frame. Attachment mechanisms are provided for securing the sub frame to the main frame following adjustment between the two. In an embodiment, at least two movable platens are carried on at least one of said frames, both of the platens being movable in a longitudinal horizontal direction and at least one of the platens is movable in a vertical direction. A linear actuator is drivingly connected to the two movable platens. In an embodiment, a loading system for loading dough balls onto the belt is provided. The loading system includes a transport mechanism to receive dough balls in a sequential stream and to deliver the dough balls to the belt at a speed equal to a speed of the belt. In an embodiment, a belt splicing hot press is carried on the frame operatively engageable with the belt to splice together severed ends of the belt to form a continuous endless belt.

27 Claims, 21 Drawing Sheets

RECIPROCATING HEAD PRESS

This application claims priority to U.S. provisional patent application Ser. No. 60/400,169, filed on Aug. 1, 2002.

BACKGROUND OF THE INVENTION

The present invention relates to presses used to flatten dough-like material, for example edible dough materials used in tortillas, pizzas and similar food items.

Presses for dough material are well known and one type comprises a stationary press in which individual dough pieces are placed under a vertically movable platen, the platen compresses and spreads out the dough and then the platen is moved away revealing a flattened dough piece which must be manually removed. Another type is an automated dough press which typically comprises a moving belt and a vertically reciprocating platen. Generally the belt is stopped, and while stopped the platen, moves downwardly to engage and flatten a dough piece against the belt and then the platen moves upwardly. Subsequently the belt indexes to the next position to present a new series of dough pieces to the platen. While such an operation greatly increases the speed at which the dough pieces can be flattened into disks, such as tortillas and pizza crusts, the intermittent movement of the belt places a restriction on the speed at which the overall operation can be carried out, and the starting and stopping of the belt causes other difficulties relating to timing, energy requirements, wear and tear on the equipment as well as movement of the dough pieces relative to the belt.

A third approach to flattening dough pieces utilizes a continuously moving belt carrying the dough pieces and a roller positioned above the belt which engages and rolls out the dough onto the moving belt. While this arrangement allows for continuous movement of the belt, and so avoids the problems associated with intermittent operation of the belt, this approach creates its own problems, for example, the resulting dough pieces typically are not circular, but rather are oblong in shape, which are not as aesthetically pleasing for tortillas and pizzas. A raised rim, such as is used in pizza crusts, cannot be formed with this method and the dough itself responds differently when it is rolled out, as opposed to being pressed, which can affect the subsequent cooking of the dough. Finally, while the dough piece is being rolled out, the contact time between the roller and the dough itself is very brief which prevents the use of heat to condition the dough as it is being flattened, thus requiring an additional step if heat is to be applied.

A fourth approach to flattening dough pieces utilizes a continuously moving belt for receiving and carrying the dough pieces into the press area and from the press area to a point of further utilization. Vertically reciprocating platens are used to press the dough pieces into flattened shapes and the platens can be heated so as to provide heat into the dough product.

To allow both a vertically reciprocating platen and a continuously moving belt, the platens themselves are horizontally reciprocating such that as they move together and press the dough pieces onto the belt, the platens will be moving in the same direction and at the same speed as the belt itself. When the step of pressing, and optionally heating, is completed, the platens will move away from the belt and will be moved linearly backwards relative to the motion of the belt to be in position over a new set of dough pieces to be flattened. At this point the platens will reverse direction again and will accelerate up to the same speed in the same direction as the belt while the pressing occurs again.

Such an arrangement is shown in U.S. Pat. Nos. 4,938,126 and 5,006,358, both to Rubio, et al. In this parent and division patent there is disclosed a reciprocating press for making tortillas from dough balls in which various of the moving components are mechanically "slaved" to the press drive to control the timing of their respective actions. That is, the reciprocation movement of the press is controlled through a crank arm, cam and follower arrangement driven by the belt motor. The arrangement for controlling the speed of the feed mechanism is not disclosed.

U.S. Pat. No. 5,388,503 to Berkel discloses a reciprocating press for forming tortillas from dough balls in which the reciprocating movement of the press is achieved by a direct mechanical linkage to the drive for the conveyor belt. No feeding mechanism is disclosed for loading the dough balls onto the moving press belt.

SUMMARY OF THE INVENTION

The present invention provides an apparatus and method for flattening dough pieces which combines the advantages of pressing the dough to obtain circular or other desired shapes, allows for heating the dough while pressing, allows for continuous operation, and particularly of the belt carrying the dough pieces, and avoids the problems associated with various approaches known in the art.

In one embodiment of the invention, a dough loading apparatus is provided to deposit dough balls precisely onto a moving belt, at the same speed as the moving belt to avoid the necessity of flattening the dough balls to prevent their movement relative to the belt.

In an embodiment of the invention, a dough ball guide tube is provided with an ejection arrangement to prevent the passage of doubled dough balls from a proofer to be transported through the press.

In an embodiment of the invention, a sensor is provided to detect jamming of dough within the dough ball feeder.

In an embodiment of the invention, an independent dough loading apparatus is provided which can be quickly and precisely aligned and joined to the press and which can be removed and replaced with a different sized dough loading apparatus without the need for special tools or time consuming disassembly and re-assembly operations.

In an embodiment of the invention, the press is supported by an arch style H-frame assembly to provide enhanced strength and stability for the moving upper platen.

In an embodiment of the invention, a die plate is carried on the upper and/or lower platen which is removable for replacement, cleaning or repair and which can be quickly released from the platen without the use of special tools.

In an embodiment of the invention, the vertically reciprocating platen is restrained against rotation.

In an embodiment of the invention, the reciprocating platens are securely held in a level orientation during their horizontal movement.

In an embodiment of the invention, a linear actuator and linear guides and support systems are used for reciprocating the press platens.

In an embodiment of the invention, a conduit and cable management system is provided for electrical and hydraulic lines extending between the reciprocating press components and the stationary frame components.

In an embodiment of the invention, a belt splicing hot press unit is provided for repair and replacement of the main conveyor belt of the press.

In an embodiment of the invention, the linear actuator is servo driven to control the position, acceleration and speed of the reciprocating press platens.

In an embodiment of the invention, a brush roller is used in a transfer of tortillas from the press belt to a discharge belt.

In an embodiment of the invention, dual drive rollers, with urethane coating, are used to drive the press belt.

In an embodiment of the invention, various components of the press are carried on a sub-frame which is independently levelable relative to a main frame carried on a supporting surface.

In an embodiment of the invention, jack screws are provided for an independent leveling of a sub-frame assembly.

In an embodiment of the invention, the linear guide elements are carried on a sub-frame independent from a main frame of the press.

In an embodiment of the invention, a single controller is used to coordinate the various movements of each of the components of the press system.

In an embodiment of the invention, the controller controls multiple zones of the platens with respect to their temperature.

In an embodiment of the invention, the movement of the press is coordinated with movement of other components in a dough processing system.

DETAILED DESCRIPTION OF THE PREFERRED EMBODIMENTS

A. Overview

Figure 1:
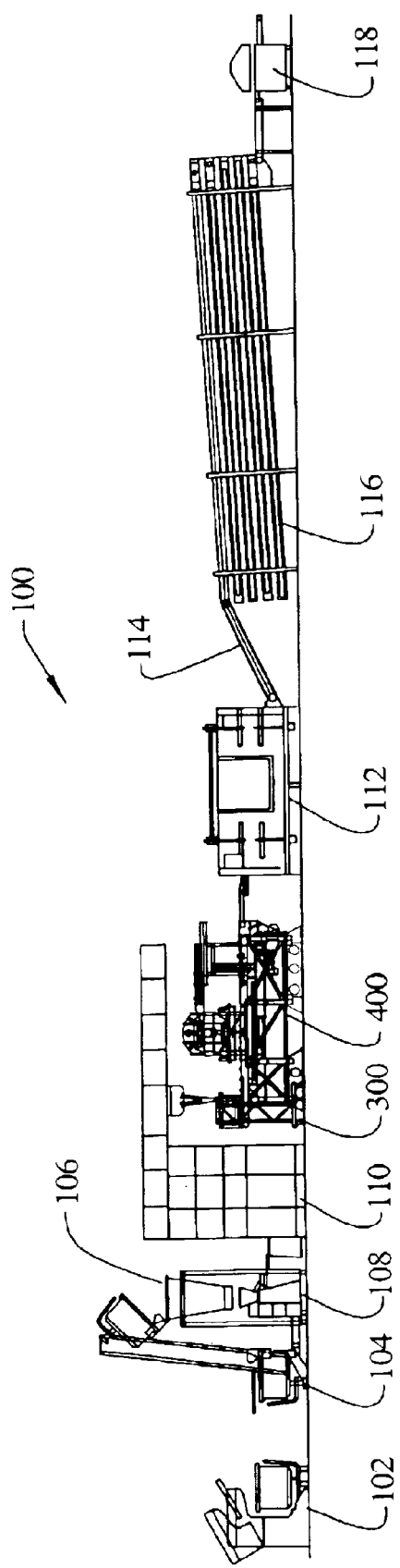
FIG. 1 is a schematic side elevation view of a dough processing system incorporating a press embodying the principles of the present invention.

The present invention relates to a press 400 for flattening dough pieces, for example, flattening dough balls into pancake like shapes for tortillas, pizza crusts and similar food products. Because of the high rates of product through the press, the press is typically arranged in a system 100 of mechanisms as illustrated schematically in FIG. 1. This system can begin with a dough mixer 102 in which flour, corn meal or similar product is mixed with water and other ingredients according to some particular recipe to produce a large batch of dough. The mixer may include an elevator 104 to raise a portion of the mixer to an elevated position where the mixed dough batch is dropped into a holding hopper and dough chunker 106. In the holding hopper and dough chunker 106 the batch of dough is held and then chunks of dough are dispensed into a dough divider and rounder 108 in which the dough is divided into much smaller portions and is rounded into ball shapes. The rounder 108 then feeds individual dough balls to a proofer 110 where the dough balls are held at a predetermined temperature and humidity for a prescribed length of time, such as by moving along a conveyor traveling through the proofer where the dough balls are held in individual pockets or trays in the proofer. At the end of the proofing time, a series of dough balls are dispensed through a dough loading apparatus 300 to the press 400, such as the press incorporating the principles of the present invention. In the press 400, the individual dough balls are pressed between movable platens while the dough balls are carried on a continuously moving conveyor belt, all as described in more detail below. When the dough balls have been flattened into pancake-like shapes, they are dispensed from the end of the press 400 to an oven 112 where the dough products are partially or fully baked. Following the baking process, the dough pieces move on a conveyor 114 to a cooling conveyor 116 from where they are moved to a packing system 118 or storage area.

B. Control System

Figure 2:
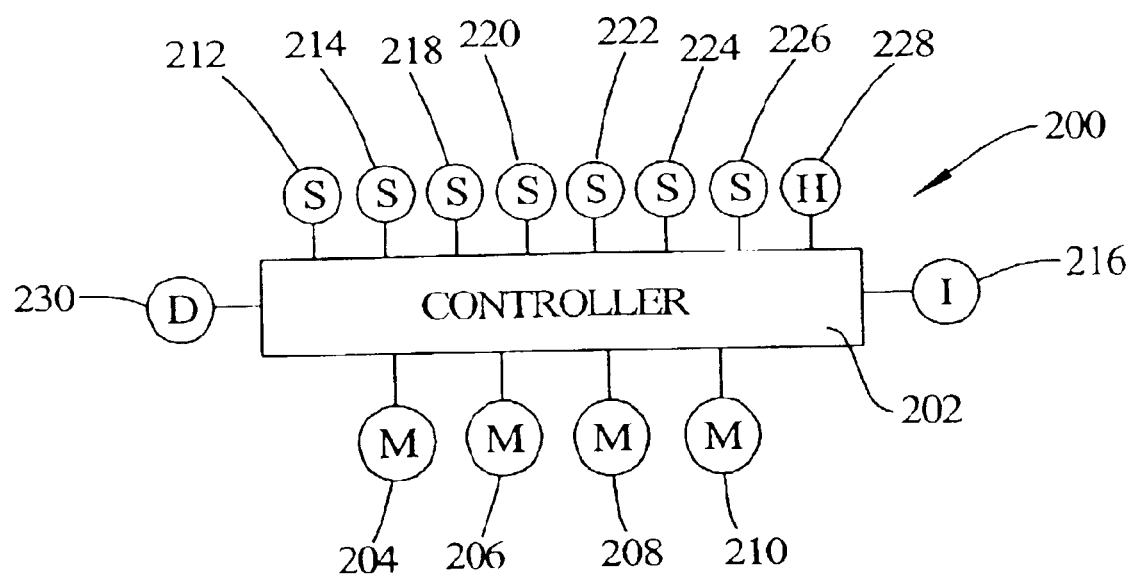
FIG. 2 is a block diagram of a control system for the press embodying the present invention.

Preferably a single control system 200, as shown schematically in FIG. 2, is utilized to control all of the different functions, movements and operations of the reciprocating press 400 and including the dough loading apparatus 300. A programmable logic controller 202 or PLC can be used to operate various motors of the system and preferably several of the motors are servo motors so the speed and angle of rotation of the motor drive shafts can be controlled precisely. A motor 204, preferably a servo motor, is used to regulate the loading speed of the dough loading apparatus 300. A motor 206, preferably a variable speed motor, is used to move the belt 602 which carries the dough pieces. A motor 208, again preferably a servo motor is utilized to operate a linear actuator to move the press platens in a reciprocating fashion in the direction of the belt movement. A motor 210, preferably a variable speed motor, is used to drive an out feed conveyor and an unloading roller. The timing and operation of each of these motors must be orchestrated very carefully with respect to each other, as well as with respect to other mechanisms in the system 100 to maintain a steady flow of dough product through the system 100.

The controller 202 is provided with a number of inputs. A first sensor 212, which preferably is an encoder, is utilized to sense the speed of the proofer 110 and this sensed speed is provided to the controller 202 so that the speeds of the various other components can be adjusted accordingly as product from the proofer 110 is delivered to the dough loading apparatus 300 and the reciprocating press 400. A sensor 214, which may be in the form of an encoder, provides a signal to the controller 202 with respect to the speed of the belt 602 so that delivery of the dough balls by the dough loading apparatus 300 are spaced accurately onto the belt. An input device 216, which may be a keyboard, a touch screen, or other known input devices, is provided to the controller 202 to allow entry of various information including the size and placement of the dough pieces to be pressed, the pressure to which the dough pieces are to be pressed, the dwell time for the platens to be held in their closest position, the temperature at which the platens should be maintained, and other operating variables. At least one temperature sensor 218 is provided which is associated with the platens to measure a temperature at the platens and to provide that information to the controller 202. In an embodiment of the invention, a plurality of temperature sensors 218 are provided which sense the temperature of different zones of the platens for better maintenance and control purposes. A sensor 220 is used to determine a "full down" position for the upper press platen. A sensor 222 is used to detect any "clogs" in an in-feed tube of the dough loading apparatus 300. A sensor arrangement 224 is used to "home" the platens in a horizontal direction. A sensor 226 is used to "home" the dough loading apparatus 300. Heating elements 228 in the platens are controlled by the controller 200. A display device 230 is provided to provide a visual and perhaps audible display of the operation of the press and system for operation and control.

C. Dough Loading Apparatus

Figure 3:
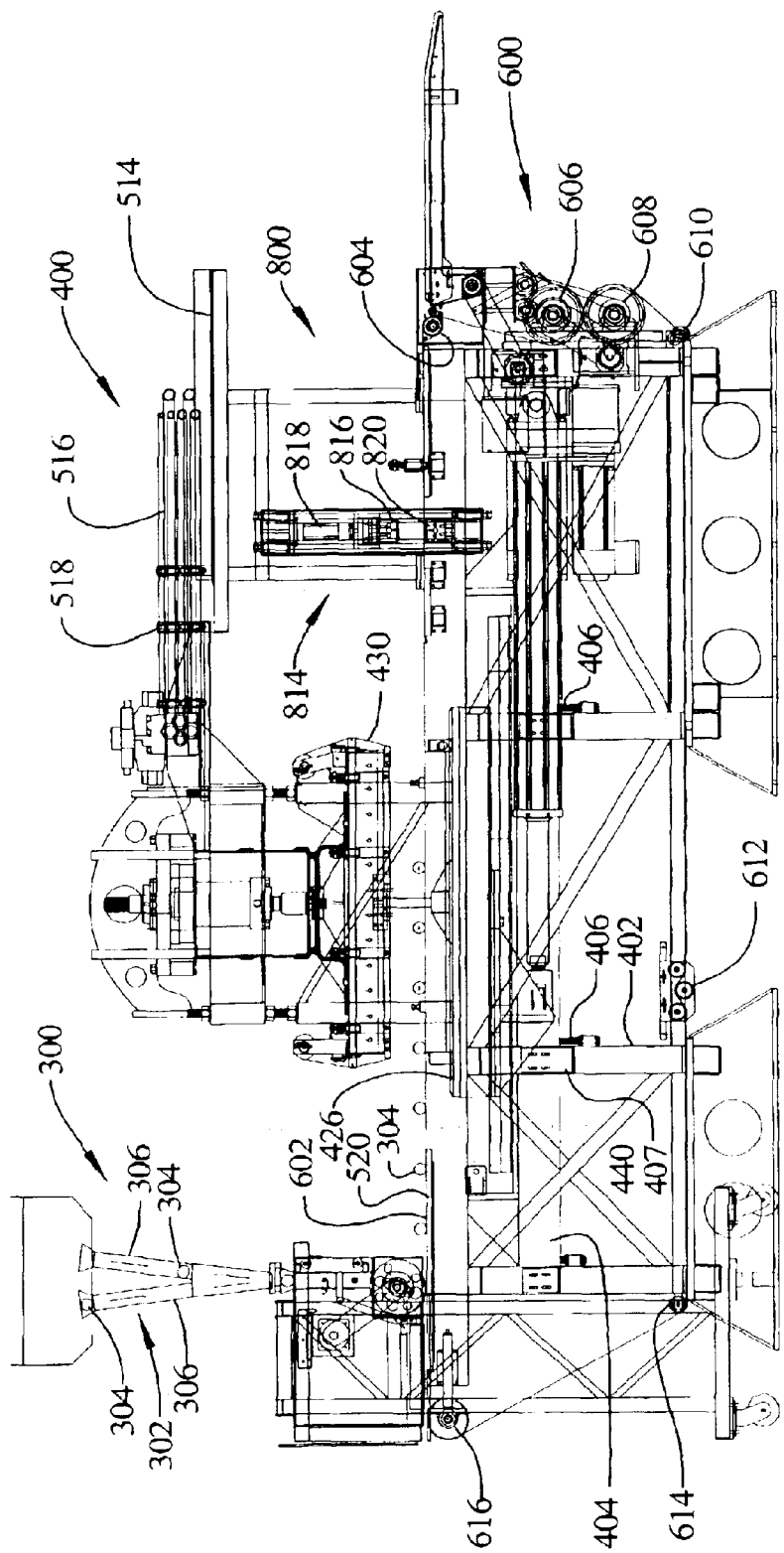
FIG. 3 is a side elevational view of the press embodying the present invention.

In FIG. 3 there is illustrated a reciprocating press generally at 400 as well as a dough loading apparatus 300. A dough feeding device 302 is provided to feed dough in the form of dough balls 304 to the dough loading apparatus 300 (shown in greater detail in FIGS. 4–6). The dough feeding device 302 in turn may receive dough balls 304 from the proofer 110 in which the formed dough balls have been carried for a length of time at a prescribed temperature and humidity level to allow the dough to proof. The dough balls 304 are fed from the proofer 110 through the dough feeding device 302, which may comprise a series of drop tubes 306 in which dough balls drop into a receiving inlet 308 (shown in greater detail in FIG. 5), at a predetermined rate. The dough receiving inlet 308 may be in the form of a truncated cone or funnel shape to assist in guiding individual dough balls 304 into the dough loading apparatus 300. The inlet 308 to the dough loading apparatus 300 leads to one or more vertical guide tubes 310. The tubes 310 may have a circular, square or other shaped cross section and extend downwardly and terminate just above a rotatable pocket wheel 312.

The drop tubes 306 of the dough feeding device 302 typically are hinged near their top to swing away from the inlet 308 of the dough loading apparatus 300 for cleaning and other maintenance purposes. To assure a proper placement of a lower end 314 of the drop tube 306 relative to the funnel inlet 308, a drop tube receiver and guide 316 may be mounted above the inlet 308. The tube receiver and guide 316 has a U-shaped opening 318 (FIG. 6) to receive and precisely locate the lower end 314 of the drop chute 306. The drop tube receiver and guide 316 is mounted on legs 320 above a flange 322 at the top end of the inlet 308. In this manner, the material utilized for the drop tube receiver and guide 316 can be kept at a minimum while accommodating the swing of the drop tubes 306 which require their lower ends 314 to be spaced above the flanged top of the inlet funnel 308. The drop tube receiver and guide 316 can be formed of a light weight and inexpensive material, such as U.H.M.W. plastic.

Figure 5:
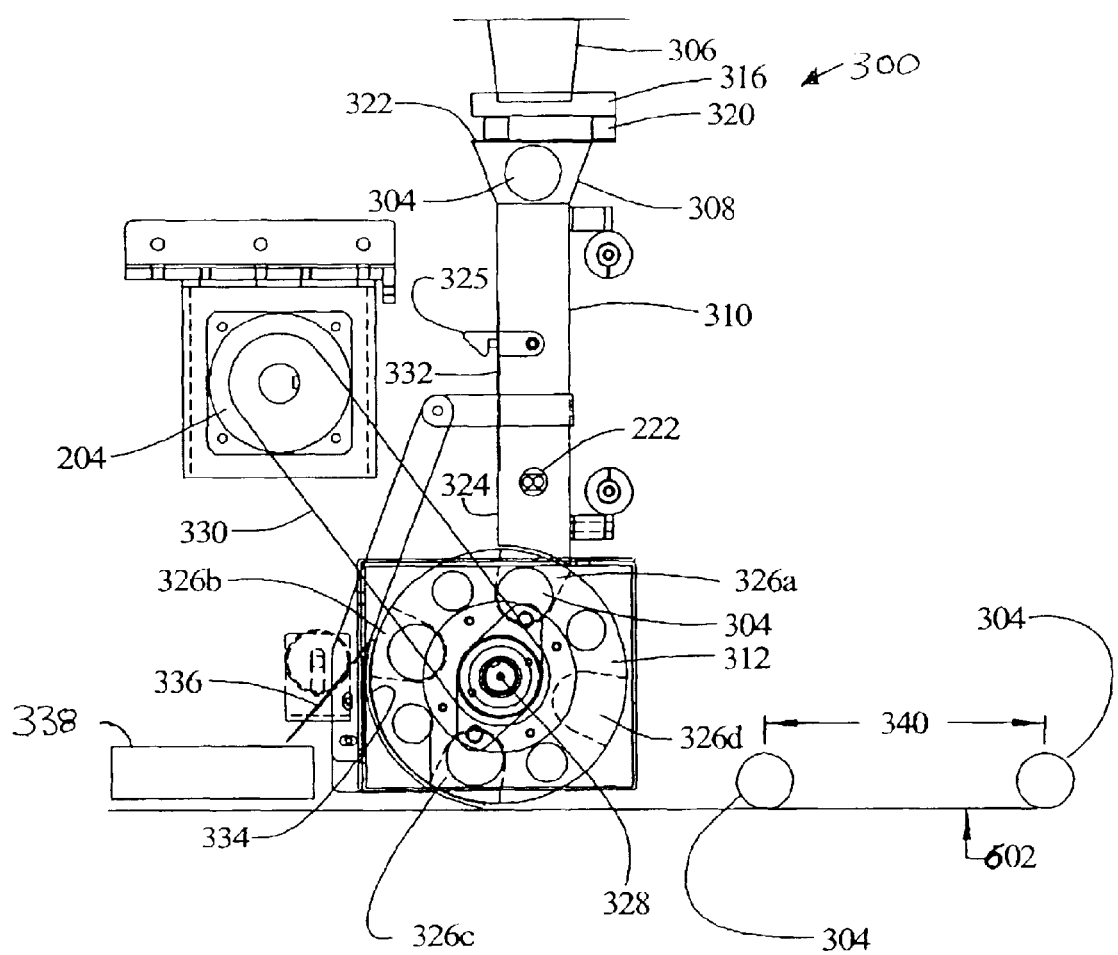
FIG. 5 is an isolated side elevational view of a portion of the loading system of FIG. 4.
Figure 6:
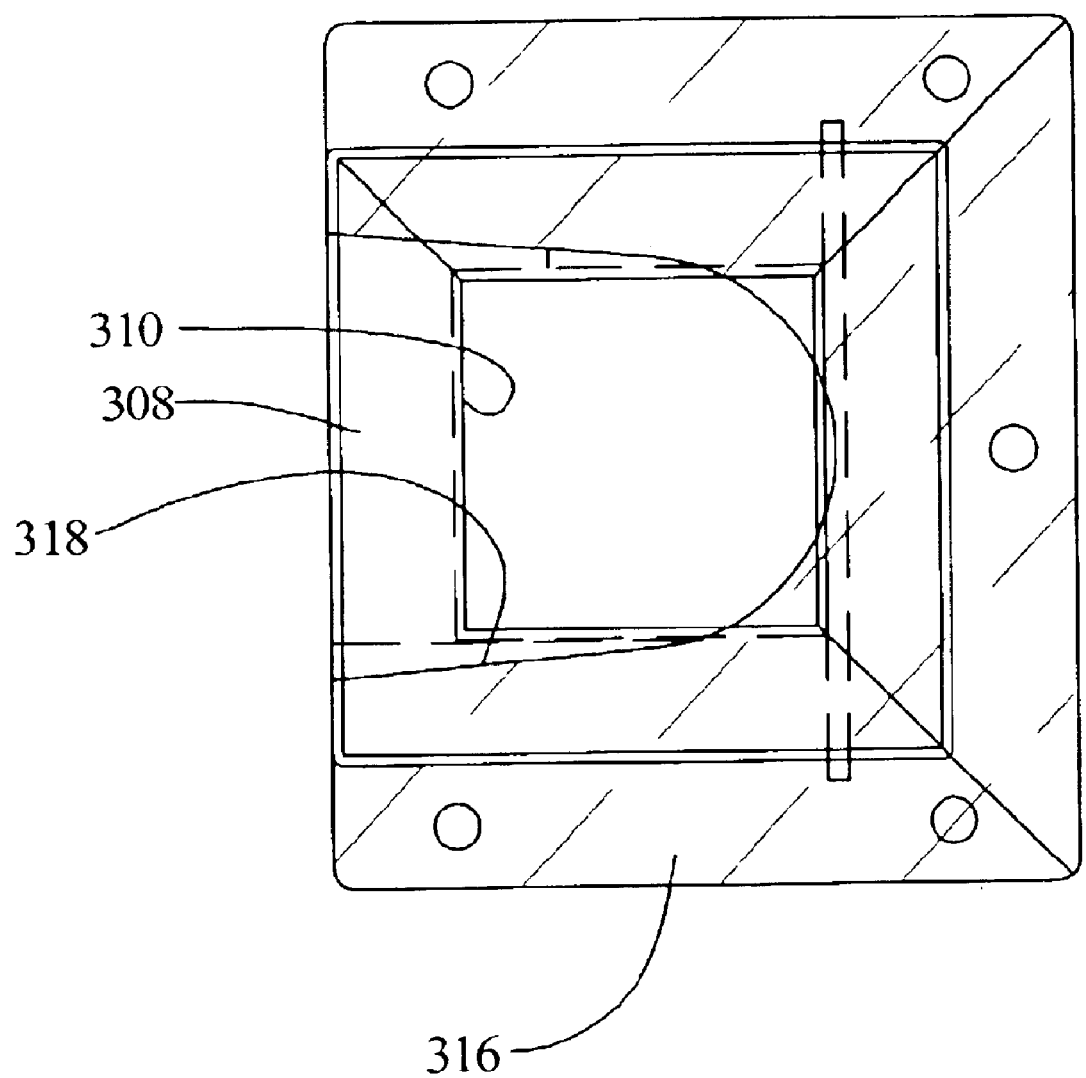
FIG. 6 is a plan view of a portion of the loading system of FIG. 4.

The guide tubes 310 may be provided with an opening or cut out 324 (FIG. 5) positioned just above the pocket wheel 312 to allow for the ejection of a potential upper dough ball of a double dough ball which has fallen through the guide tube 310. Occasionally two dough balls may get stuck together in the proofer 110 and may fall together through the drop tubes 306. In order to prevent the double ball from continuing on into the press 400, the opening 324 permits the uppermost dough ball to be ejected during the loading process. The lower dough ball drops into one of several pockets 326a–d formed in an outer periphery of the pocket wheel 312. The pocket wheel 312 is rotated about an axis 328 by means of the motor 204 connected to the pocket wheel 312 by means of a belt drive 330, such as a timing belt. The pocket wheel 312 is driven in a counter clockwise direction, as seen in FIG. 5, so that the dough ball 304 received in the uppermost pocket 326a will move to the left. If a second dough ball is captured on top of the dough ball in the pocket 326a, the second dough ball will move out of the guide tube 310 through the sidewall opening 324, leaving the guide tube empty to allow the next dough ball 304 to drop down to the next pocket. The sensor 222, which may be a diffused type photoelectric sensor, can be placed in the guide tube 310, spaced above the lower end 314 of the guide tube, to sense for product jamming. For example, if the sensor 222 detects a blockage which continues beyond some set period of time, measured in seconds or portions thereof, the controller 202 may cause an alarm to sound and, if the sensed blockage continues for a further length of time, measured in additional seconds, the controller 202 could stop the entire press 400.

The opening 324 in the guide tube 310 can be adjusted in size by the use of vertically adjustable sliding door 332. This allows the entire loading apparatus 300 to be able to be used with different sized dough balls and to accommodate allowing ejection of large dough balls, when large dough balls are being fed through the apparatus, yet preventing too large an opening when small dough balls are being fed through the apparatus, which might otherwise lead to improper ejection of the small dough balls. When the opening 324 is provided, it is preferable to form the guide tube 310 with a square cross section. This way the opening 324 takes up no more than one fourth of the perimeter of the guide tube 310, thereby maintaining the strength and integrity of the guide tube. The door 332 may also be hinged and held closed by a latch 325. This permits access to the interior of the guide tube 310 for cleaning and maintenance purposes.

As the dough balls (the one in the pocket and the potential double dough ball) are rotated by the pocket wheel 312, they will move to a second position in which the pocket 326b is partially eclipsed by a dough ball retaining shoe 334. This shoe 334 will retain the properly captured dough ball 304 in the pocket 326b and will cause any second dough ball carried outside the perimeter of the pocket wheel 312 to be released from the pocket wheel. The released dough ball may be deposited onto a sloped ramp 336 (FIG. 4) leading to a collection zone 338 from where the collected extra dough balls can be removed, either manually or via a conveyor mechanism.

The pocket wheel 312 is indexed from one stationary position to a next stationary position by means of the motor 204 which preferably is a servo motor. The servo motor receives speed information relating to the continuously moving belt 602 of the press 400 such that the pocket wheel 312 will accelerate from each stationary position to the then current belt speed before it decelerates again to the next stop position. The starting and stopping positions, the acceleration and deceleration rates, as well as the top speed (which should equal the belt speed) can each be controlled by the controller 202 when the motor 204 is a servo drive motor.

In the embodiment illustrated in FIG. 5, the pocket wheel 312 has four stations, each positioned at 90° to the other around the periphery of the pocket wheel. The uppermost pocket station 326a is positioned directly below the guide tube 310 for receiving the dough ball 304 from the guide tube. The lowermost pocket station 326c has the retaining shoe 334 still eclipsing at least a majority of the opening of the pocket 326c such that the dough ball 304 in the lowermost pocket station 326c of the pocket wheel 312 will be captured by the retaining shoe 334 while the uppermost pocket station 326a waits to receive a new dough ball 304. When the pocket wheel 312 next accelerates to belt speed, the lowermost dough ball in the lowermost pocket station 326c will be accelerated to the belt speed, will rotate clear of the retaining shoe 334 and will drop vertically onto the belt 602 at belt speed, thereby assuring that the dough ball 304 will maintain its position on the moving belt without rolling. The pocket wheel 312 will continue to rotate through 90° allowing the released dough ball 304 to move away from the pocket wheel without interference. The fourth station 326d is clear of the shoe 334 and should be empty of the dough ball 304 which has now been deposited on the belt 602. In this manner, the dough ball can be precisely placed onto the belt 602 such that a spacing 340 between adjacent dough balls 304 on the belt can be precisely controlled. The dough balls 304 will also be placed onto the belt 602 without rolling, so that the dough balls will maintain their position on the belt, even without any flattening of the dough balls as is required in intermittently operated presses.

Figure 4:
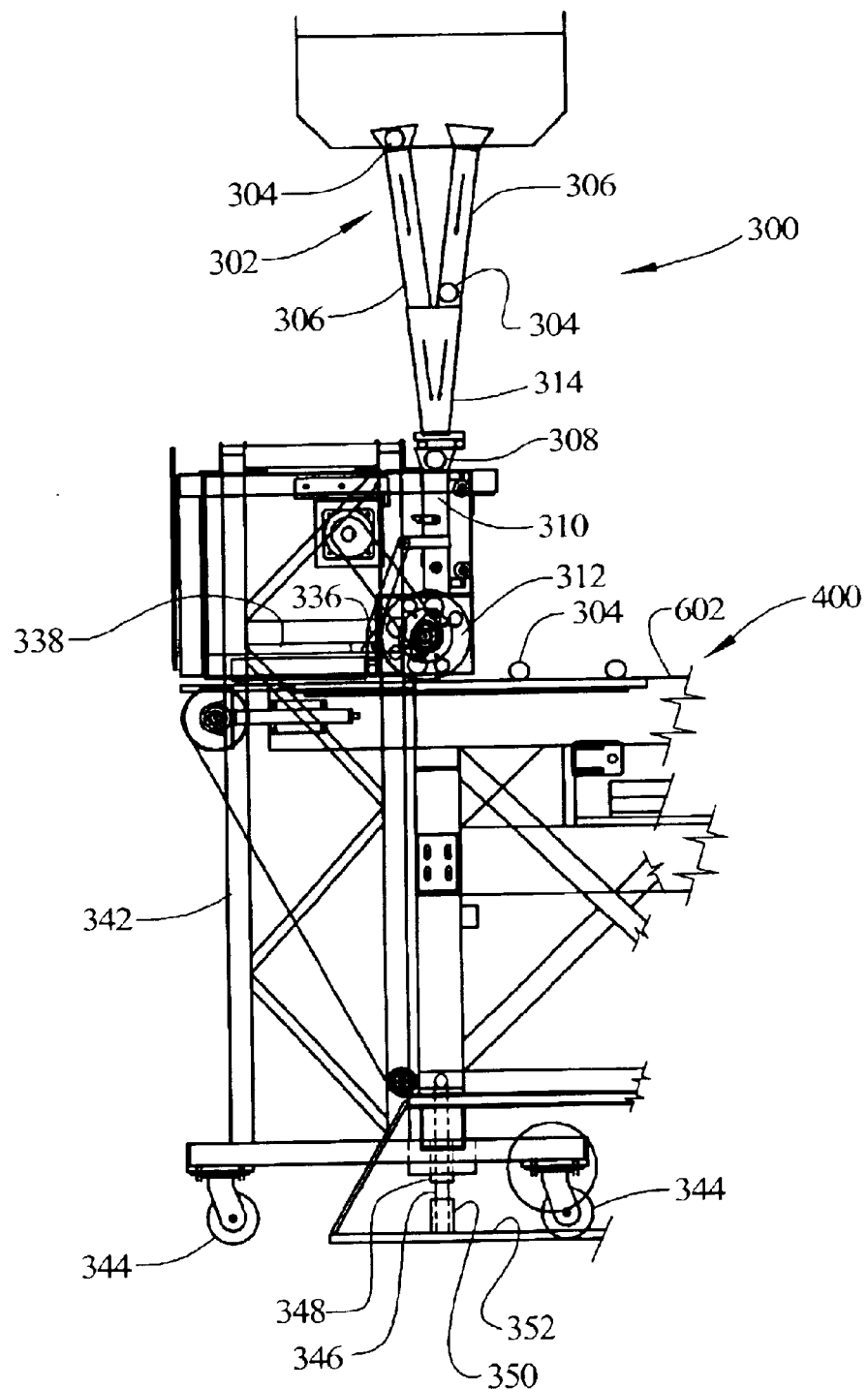
FIG. 4 is a detailed side elevational view of a loading system for the press of FIG. 3.

As seen in FIG. 4, the entire dough loading apparatus 300 is carried on a frame 342 which may be completely independent from the reciprocating press 400 and can be mounted on separate wheels 344 to allow the dough loading apparatus 300 to be selectively used and positioned relative to the press 400 as desired. The frame 342 can be wider than the belt 602 to permit the frame to straddle the belt and thereby overlie an end of the belt. A plurality of locking pins 346 (one each lateral side of the frame 342) can be received in sleeves 348 carried on the dough loading apparatus frame 342 and further received in pockets 350 secured to a frame component 352 of the reciprocating press 400 to hold the dough loading apparatus 300 in a precise alignment position with the reciprocating press 400. Dough loading apparatus 300 which can accommodate differing sizes of dough balls 304, such as with differing sized pocket wheels 312 or pockets 326, thereby can be quickly moved into position relative to the press 400 to change over a line to produce different sized dough pieces as necessary.

D. Frame Construction and Press Movement

The dough balls 304 carried on the belt 602 are to be pressed into flat pancake like shapes when the press 400 is being operated to form tortillas, pizza crusts and similarly shaped food items. To accomplish this, as shown in FIG. 3 the press 400 includes an upper platen 430 and a lower platen 426 which can reciprocate toward and away from each other to vary an open space therebetween. The two platens 426, 430 can move toward each other a sufficient amount to engage the dough balls 304 and to flatten them to a desired thickness and then to move away from one another to allow a new set of dough balls to be placed therebetween. Also, both the upper platen 430 and the lower platen 426 can reciprocally move longitudinally relative to the press 400, that is, in the direction of the moving belt 602, such that while the platens are engaging and pressing the dough balls 304, the platens move in the same direction and at the same speed as the moving belt thereby allowing the belt to continue in its movement without slowing or stopping.

In an embodiment, the reciprocating press 400 comprises a base frame 402 (FIG. 3) which can be secured to a floor or other mounting surface as well as a sub-frame 404 which carries operative components of the press. The sub-frame 404 can be secured to, but adjusted independently of the base frame 402 to allow for precise leveling of the operative components in order to eliminate any vibration caused by the moving components of the press 400. A plurality of jack screws 406 provide the adjustable attachment between the two frames and provide for a plurality of points of adjustment between the two frames, both laterally and longitudinally. Once the sub-frame 404 has been adjusted relative to the base frame 402, the two frames can be securely attached to each other through the use of suitable attachment mechanisms, such as threaded fasteners at mounting plates 407. Alternatively, a single main frame can be utilized with all components secured to the main frame.

Figure 7:
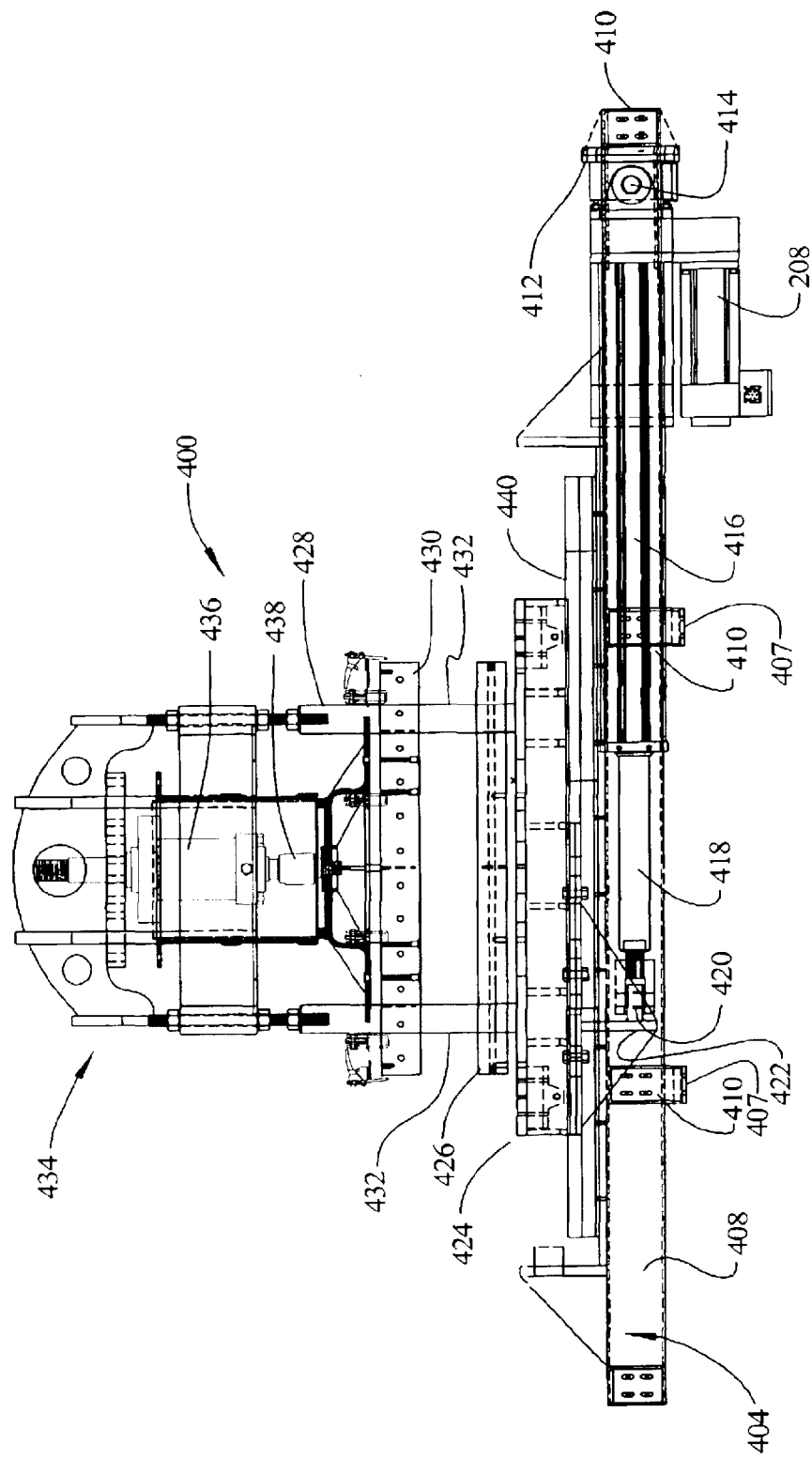
FIG. 7 is a partial side elevational view of the press of FIG. 3.
Figure 8:
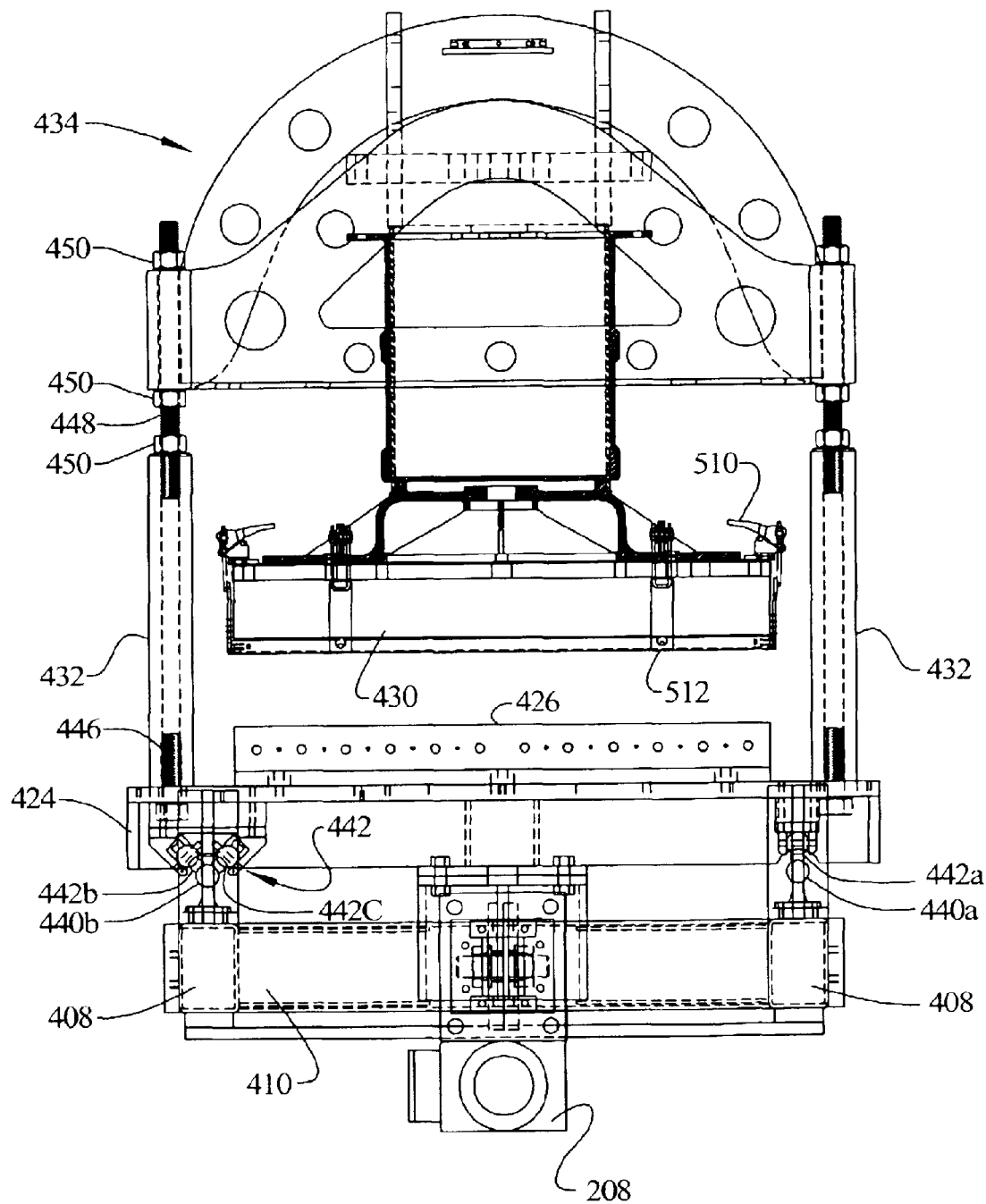
FIG. 8 is a partial end elevational view of the press of FIG. 3.
Figure 9:
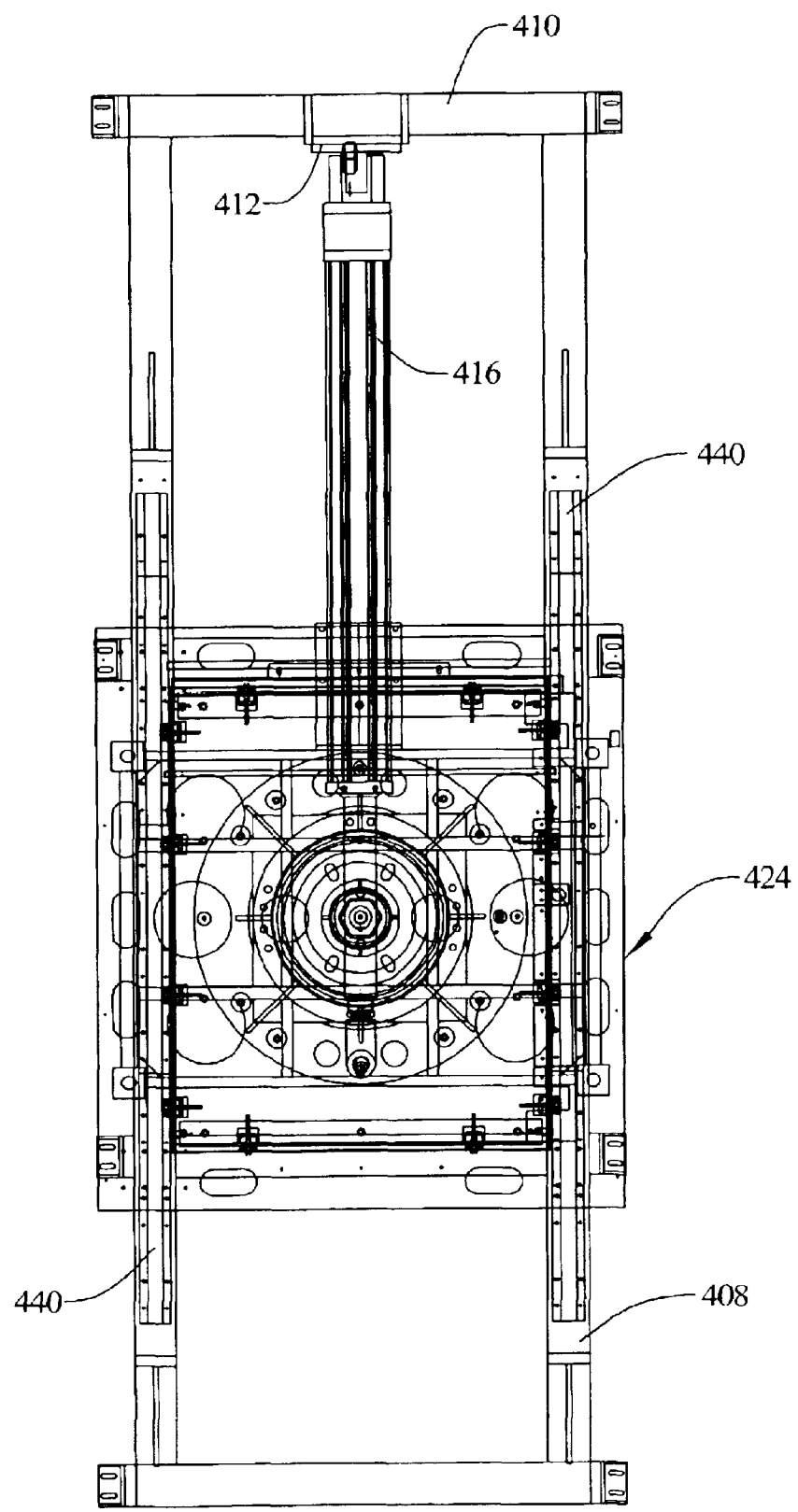
FIG. 9 is a partial plan view of the press of FIG. 3.

FIGS. 7, 8 and 9 illustrate the sub-frame 404 and the components carried on the sub-frame. The sub-frame 404 is comprised of a rectangular assembly comprised of two longitudinal frame beams 408 and a plurality of lateral frame beams 410. A mounting plate 412 is secured to one of the lateral beams 410 and an end 414 of a linear actuator 416 is secured to the mounting plate 412. The linear actuator 416 includes an extendable and retractable piston 418 which is secured to a mounting plate 420 which is, in turn, secured to a downwardly depending wall 422 of a carriage 424. The carriage 424 has secured to it the lower platen 426 as well as a support frame 428 for the upper platen 430. The support frame 428 includes four vertical posts 432 which carry an H-frame assembly 434 for supporting a hydraulic cylinder 436 which includes an extendable and retractable piston 438 to which is secured the upper platen 430.

Figure 19:
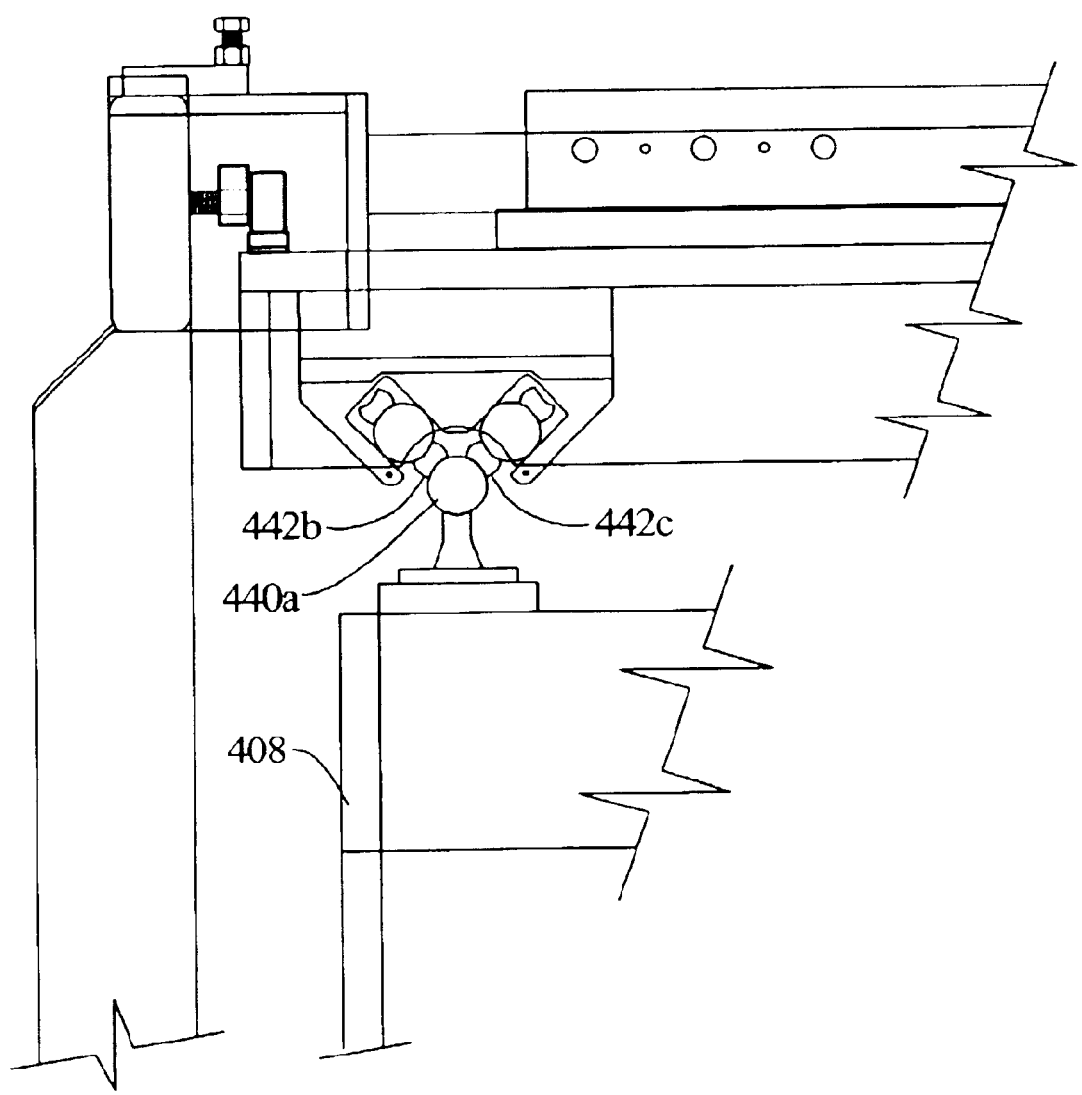
FIG. 19 is a partial cross sectional view of the linear guide and hold down assemblies.

The carriage 424 is supported on a pair of linear rails 440 mounted directly to the longitudinal beams 408 of the sub-frame 404. Four sets of linear guide bearings 442 (FIG. 8) are carried on the carriage 424 to engage the linear rails 440. In a preferred embodiment, the guide rails 440 are cylindrical bars supported above the longitudinal frame beams 408. Two linear roller bearings 442a (front and back) engage with one rail 440a (FIG. 19). Two sets of two angled linear roller bearings 442b and 442c (front and back) engage with the other guide rail 440b as shown in FIG. 8. In this manner, the carriage 424 will be carried along the guide rails 440 in a linear fashion and will be restrained against any lateral movement.

A plurality of mounting plates 407 are secured to the sub-frame 404 and are used to secure the sub-frame 404 to the base frame 402 once the sub-frame 404 has been rendered level. Thus, the entire sub-frame 404 and all of the components carried thereon can be precisely leveled and aligned, independent of the base frame 402 and then the sub-frame 404 can be securely attached to the base frame and held in the horizontal and aligned position.

The support posts 432 for the H-frame 434 are secured to the carriage 424, for example, by appropriate fasteners 446. The H-frame 434 is carried on the posts 432 by threaded rods 448 which can be independently adjustable at each post 432 to allow the H-frame 434 to be precisely leveled and aligned. The threaded rods 448 carry locking or jamming nuts 450 to hold the position of the H-frame 434 relative to the posts 432 once the precise leveling and alignment has occurred. In this manner, future adjustments to the leveling of the H-frame 434 and the movable upper platen 430 can be carried out quickly and precisely by rotation of the various nuts 450 as required.

Figure 10:
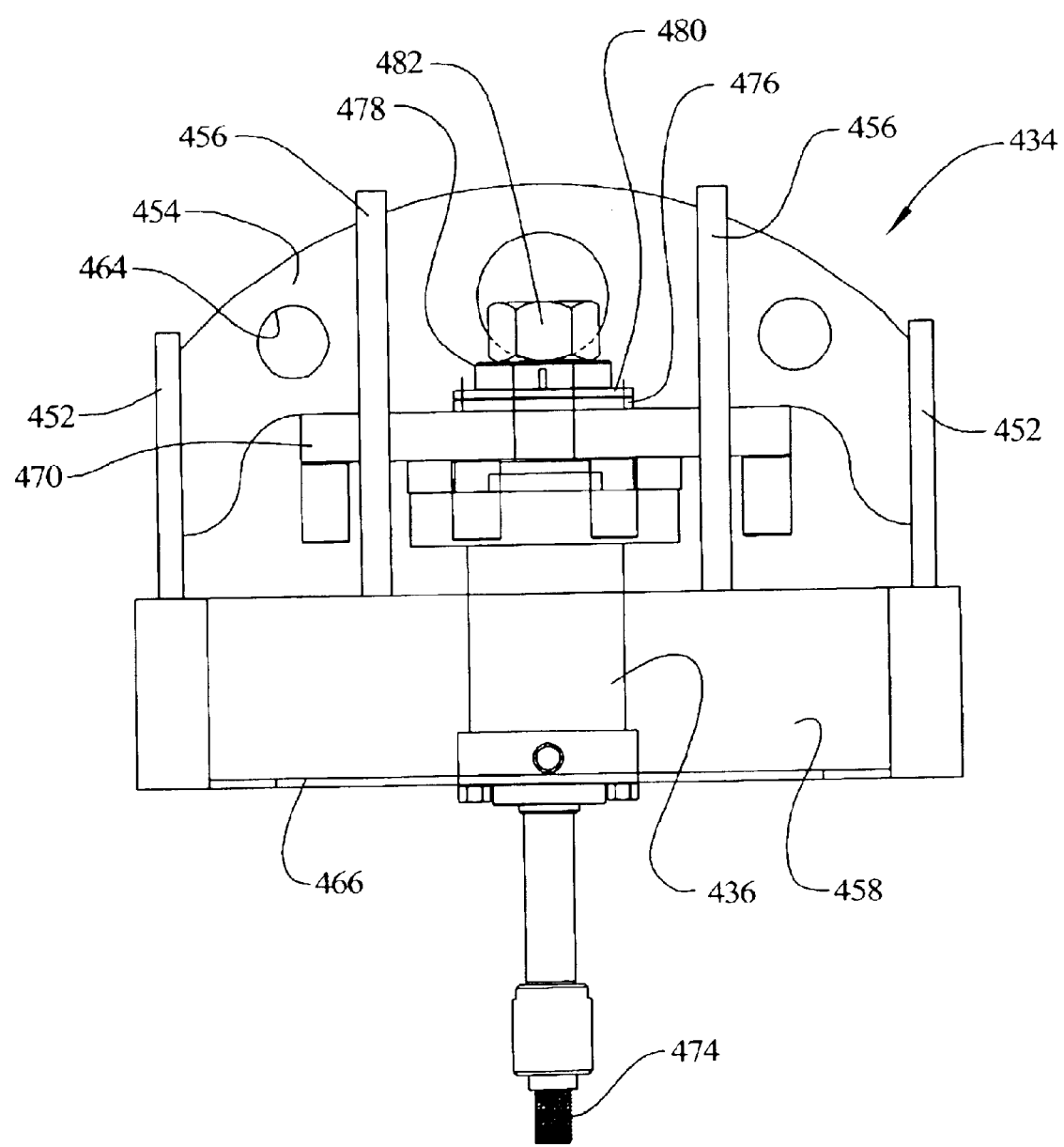
FIG. 10 is a partial side elevational view of the upper platen support frame.
Figure 11:
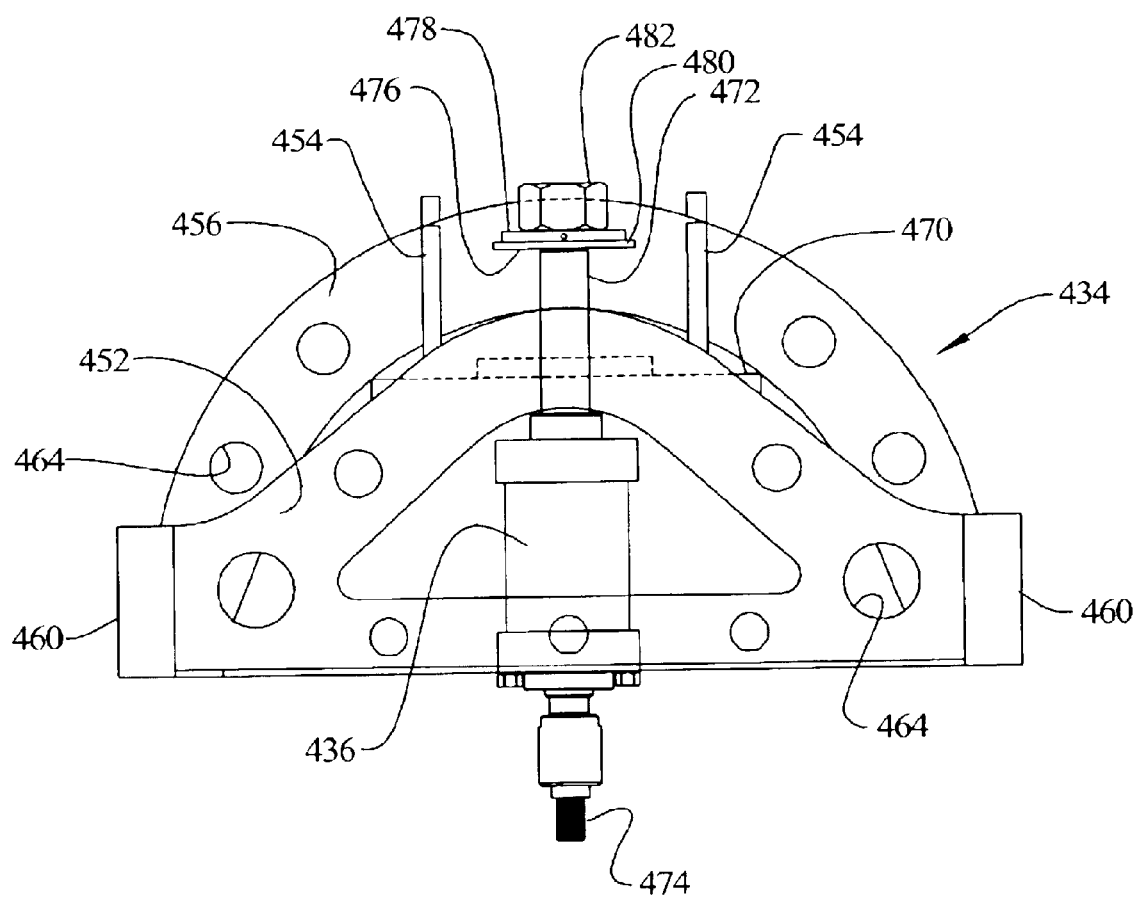
FIG. 11 is a partial end elevational view of the upper platen support frame taken 90 degrees from the view of FIG. 10.
Figure 12:
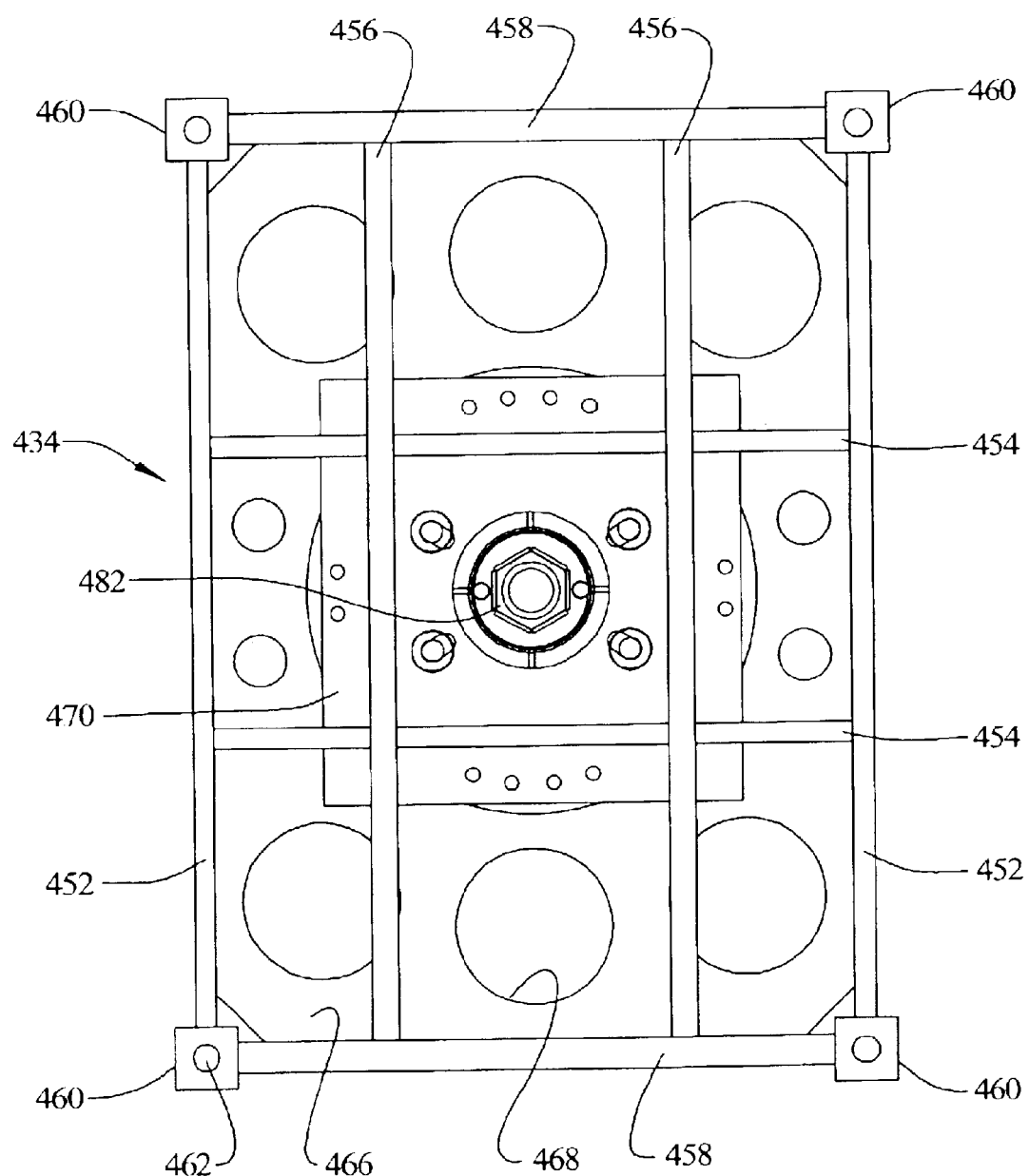
FIG. 12 is a plan view of the upper platen support frame.

The H-frame 434 is shown in greater detail in FIGS. 10–12 where it is seen that the frame assembly comprises a pair of arch shaped vertical outer plates 452 to which are secured, such as by welding, a pair of arch shaped vertical cross plates 454 which are, in turn, supported and stabilized by an inner pair of arch shaped vertical plates 456 arranged parallel to the outer plates 452. A pair of relatively short end plates 458 are attached, such as by welding, to the ends of the inner plates 456 and extend parallel to the cross plates 454. Thus, a generally rectangular box-like frame is formed by the plates 452, 454, 456, 458. Attached to each corner is a corner block 460 having a vertical passage 462 therethrough for receiving the threaded rods 448. In order to reduce the weight of the H-frame assembly, various sized and placed openings 464 can be made in the plates so long as their size and placement does not reduce the strength and rigidity of the H-frame 434.

A sheet 466 is secured as a floor to the H-frame 434 and is also provided with various shaped openings 468 to reduce its weight.

A support plate 470 is secured, such as by welding, to the vertical plates 454, 456. Secured to the support plate 470 is the double rod hydraulic cylinder 436 having an upwardly extending threaded rod end 472 and a downwardly extending threaded rod end 474. The double rod cylinder 436 can be secured to the support plate 470 by appropriate fastening means, such as threaded fasteners.

The upwardly extending threaded rod end 472 is shown in FIG. 11 in an upwardly extended position and in FIG. 10 in a downwardly extended position. In order to prevent the upper platen 430 from damaging the belt 602, a hard stop arrangement is provided on the upwardly extending threaded rod end 472. An impact pad 476 is positioned to overlie the support plate 470 and to surround the threaded rod end 472. Carried on the threaded rod end 472 is an internally threaded nut 478 carrying a steel disk 480 which is permanently affixed thereto or formed integrally therewith. The hydraulic cylinder 436 is extended downwardly so that the upper platen 430 is moved to a lowermost desired position as a safety stop position. Then, the nut 478 is threaded onto the upper threaded rod end 472 until the disk 480 engages the impact pad 476. Then a jam nut 482 is threaded onto the upper extended threaded rod end 472 to jam against the nut 478 to prevent it from moving. In this manner, a fail safe stop position is provided to prevent over travel of the platen 430 beyond the distance selected by the controller 202.

Figure 13:
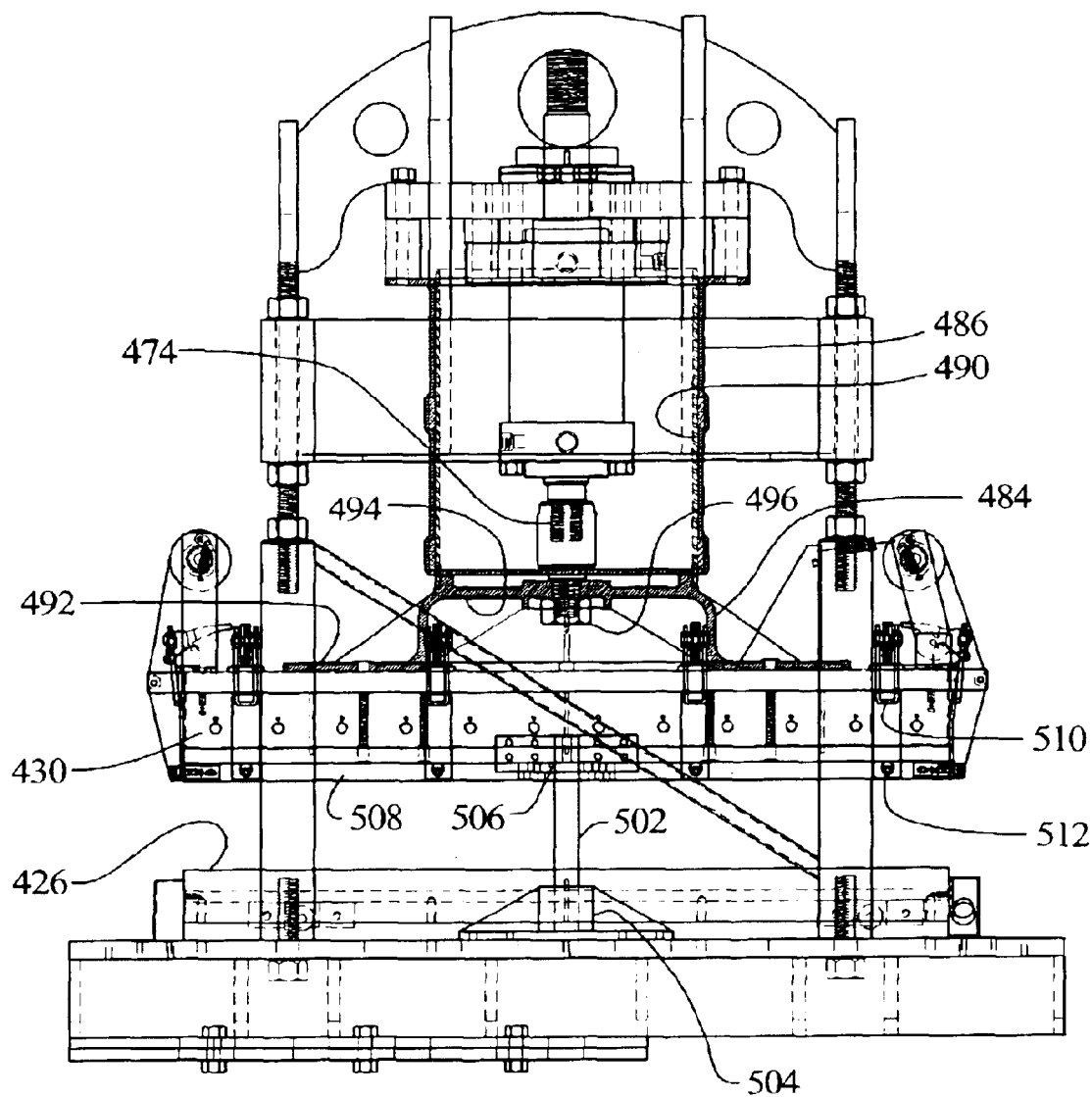
FIG. 13 is a partial end elevational view of the platens and their support structure.
Figure 14:
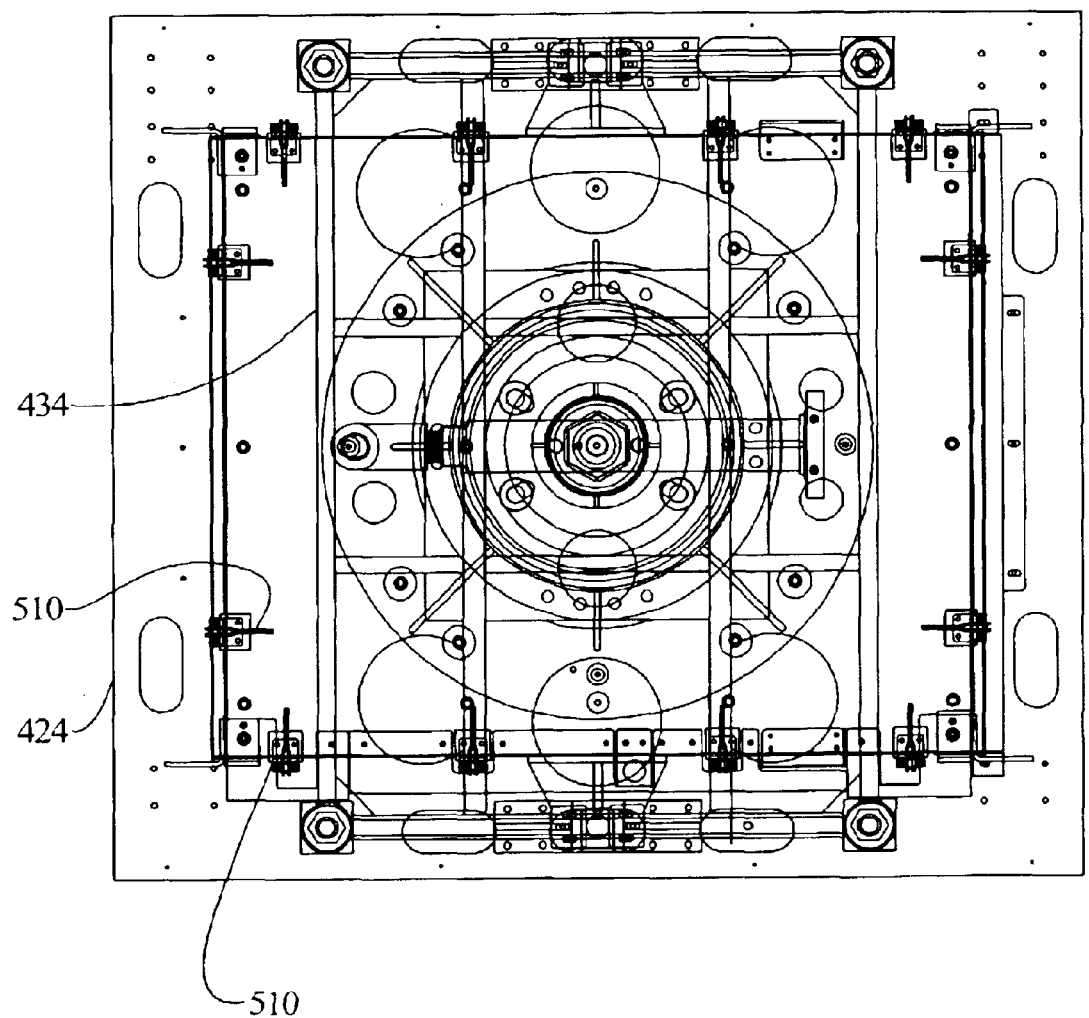
FIG. 14 is a partial plan view of the platens and their support structure.

As seen in FIG. 13, a frog 484, stabilized for reciprocal movement by a pair of nested and telescoping cylinders 486, 490 has a horizontally extending circular flange 492 to which the upper platen 430 is secured, such as by threaded fasteners. The frog 484 is also provided with a central web 494 with an aperture therethrough for receiving the downwardly extending threaded rod end 474. A threaded nut 496 is engaged onto the threaded rod end 474 to secure the end of the threaded rod to the web 494, and hence the frog 484, and when the hydraulic cylinder 436 extends the rod 474 downwardly, the upper platen 430 moves downwardly.

Figure 15:
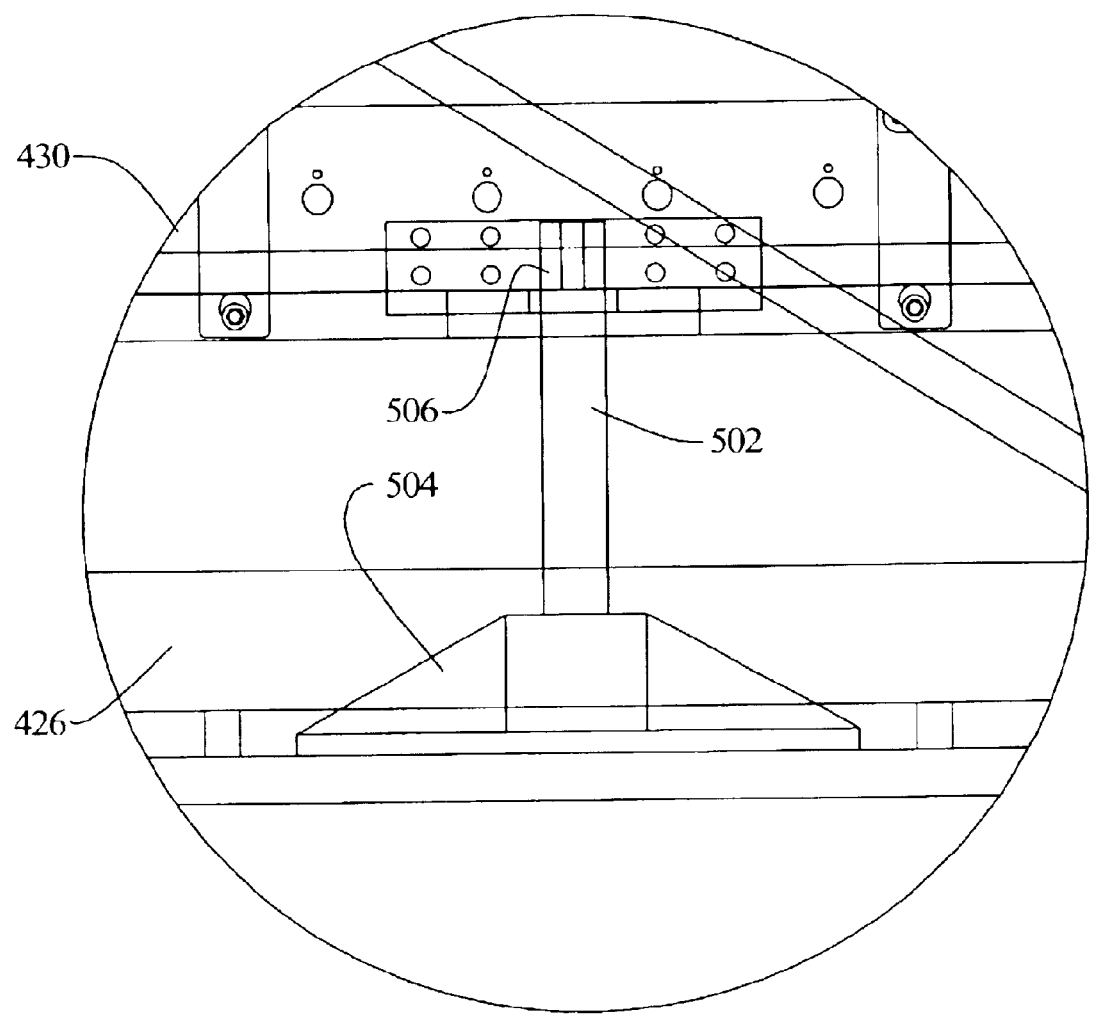
FIG. 15 is a detail side elevational view of a guide assembly for the upper platen.

As seen in FIGS. 13 and 15, a pair of guide posts 502 are provided which extend between the upper platen 430 and the lower platen 426 to prevent any twisting movement between the platens as they are reciprocated vertically toward and away from one another. The guide posts 502 are secured in a mounting 504 in the lower platen 426 and extend up through a bushing 506 in the upper platen 430 to allow for smooth linear movement of the guide post 502 in the bushings 506.

The upper platen 430 is provided with a removable free form die plate 508 which can be formed of an appropriate material, such as aluminum, with a smooth, uninterrupted surface to engage the dough pieces. The die plate 508 can be secured to the platen by a clamping arrangement 510 in which a plurality of clamps are carried on the upper platen 430 and engage laterally projecting pins 512 extending from the plate 508 so that no fasteners extend through the bottom face of the plate 508. In the course of operation of the press 400, occasionally foreign objects are deposited on the belt 602 and when those foreign objects are present between the two platens, when they move closely together under great pressure, damage to the surface of the platen could result, thus requiring it to be repaired. With the use of the die plate 508, if the surface of the die plate becomes damaged, it can be quickly removed from the upper platen 430, by releasing of the clamps 510, and replaced with a new die plate, or reversed, to use the opposite side of the die plate. Also, normal maintenance of the press 400 requires that the underside of the upper platen 430 be cleaned and by using the removable die plate 508, the die plate itself can be easily and quickly removed to facilitate the cleaning process. Further, a new die plate can be inserted and the press resume to operation while the removed die plate is being cleaned, thereby resulting in less down time for the equipment. An identical arrangement can be used at the lower platen 426, that is, a removable and replaceable die plate, preferably secured to the lower platen with quick release clamps.

Figure 20:
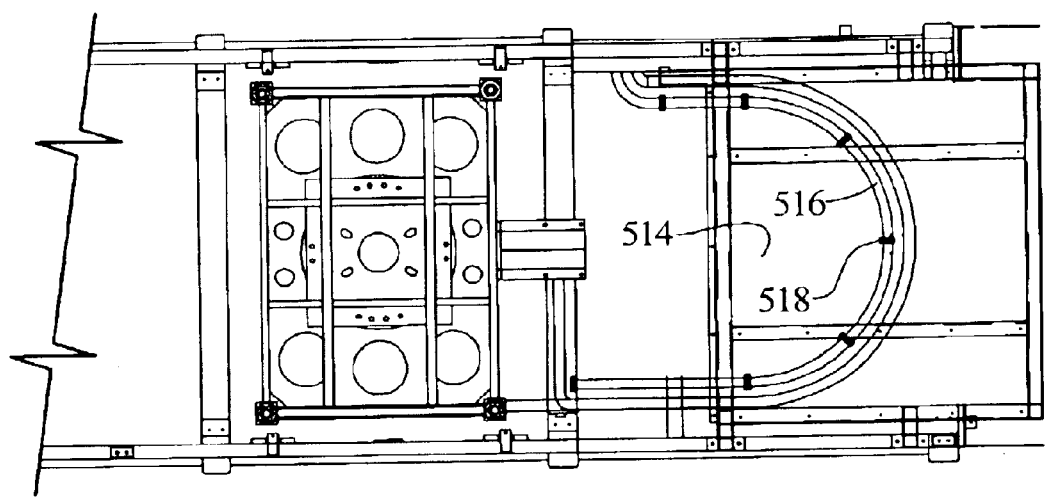
FIG. 20 is a plan view of the hose deck area of the press of FIG. 3.

As shown in FIGS. 3 and 20, a support deck 514 is provided to support hydraulic hoses and electric lines 516 which are attached at one end to the H frame 434 and upper platen 430 and at an opposite end to supply lines outside of the press 400. Custom hose plumes 518 are used to hold the hoses and lines 516 in a fixed relationship to each other, yet to allow movement of the hoses and lines as the platens 426, 430 horizontally reciprocate relative to the press frame 402, 404.

E. Belt Movement

A belt drive system 600 is mounted to the frames 402, 404 to drive the belt 602, preferably in a continuous fashion.

The base frame 402 includes a top sheet or deck 520 (FIG. 3) providing a flat surface on which the belt 602 moves while it receives and first carries the dough balls 304. The belt 602 then passes between the upper and lower platens 430, 426 and is supported by the vertically stationary lower platen 426. The belt 602 then passes over a second top sheet or deck 522 to the right of the platens as seen in FIG. 3. The belt 602 then passes over a direction changing roller 604 which is an idling roller and continues downwardly to partially wrap partially around and under a first drive roller 606, then over and partially around a second drive roller 608 and then continues downwardly to pass under a direction changing idler roller 610. The belt continues to the left (as seen in FIG. 3), under the press 400, passes over a support roller 612, then partially wraps around a direction changing idler roller 614 and up and around and over a direction changing idler roller 616 which aligns the belt with the surface of the top sheet 520 from which it continues as just described. One of the rollers, and preferably the idler roller 616, is adjustably mounted to the frame 404 such that it can be used to provide a desired tension to the belt 602 once the belt is assembled onto the press 400. The belt 602, thus, is an endless belt and moves continuously around the press 400 driven by the drive rollers 606, 608.

Figure 17:
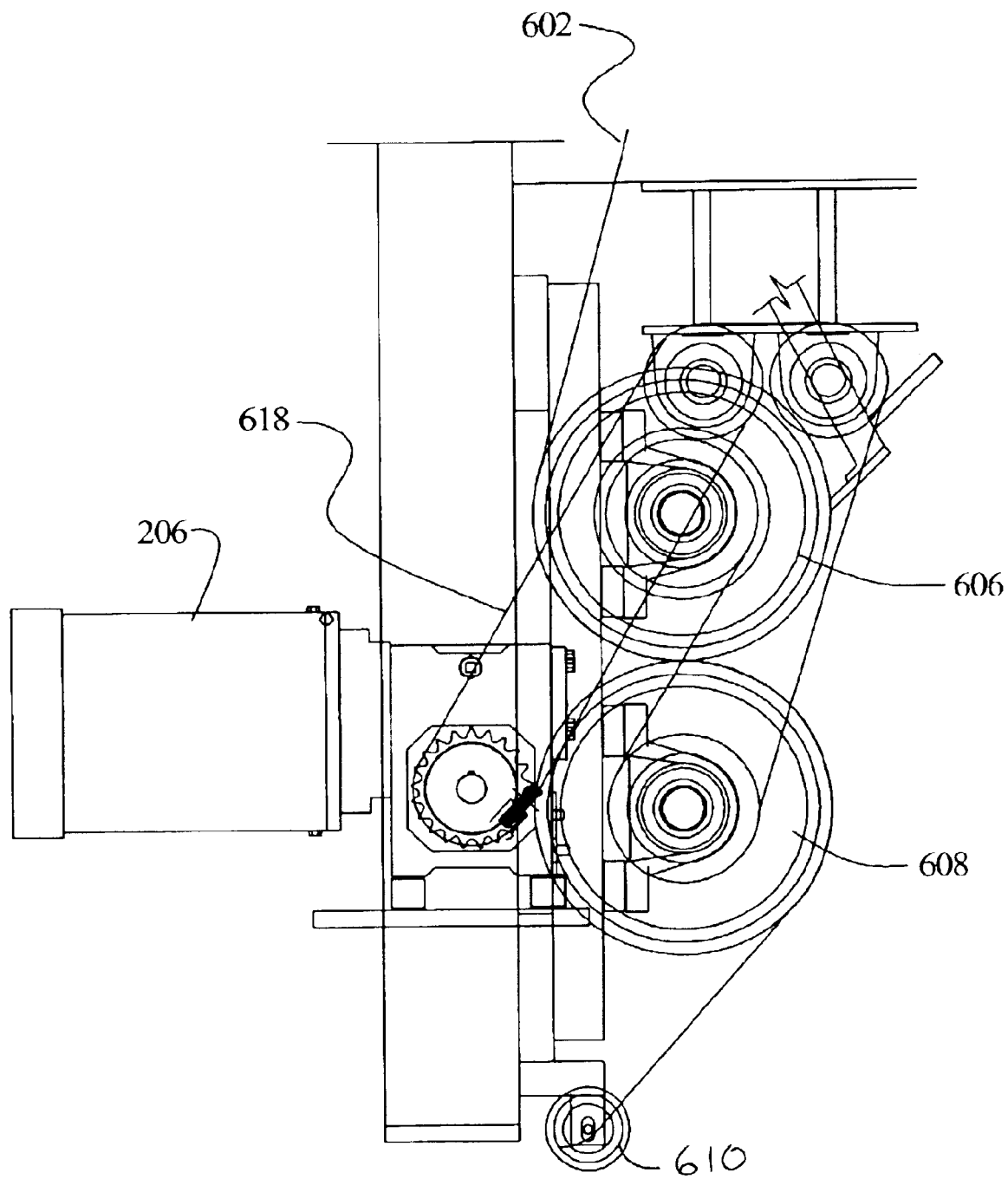
FIG. 17 is a partial side elevational view of the drive area for the press belt.
Figure 18:
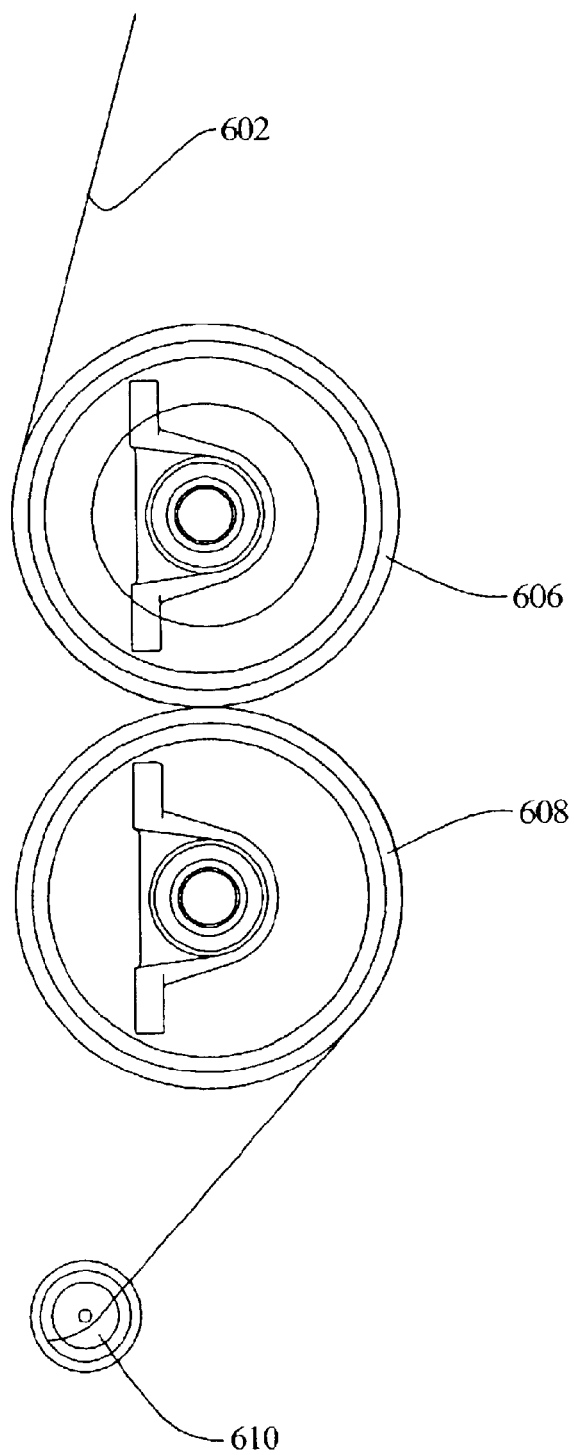
FIG. 18 is a partial side elevational view of the drive area for the press belt.

As shown in FIGS. 17 and 18, the drive rollers 606, 608 are driven, in opposite rotating directions, by the motor 206 which preferably is a variable speed drive motor whose speed can be controlled precisely. A single chain 618 is used to drive both rollers 606, 608 to assure that their speed is identical to prevent any stretching or slipping of the belt 602. Preferably the rollers 606, 608 are urethane coated so that the rollers will grip the belt 602 to maintain a constant, steady motion. The ductility of the urethane also allows excess dough or other malible debris to pass between the rollers 606, 608 without belt damage. While the preferred mode of operation would be to operate the motor 206, and therefore drive the belt 602, at a constant speed during the press operation, the press 400 may be placed into a system 100 with other components, such as the proofer 110 described above, which may experience some variability in speed of delivery of dough balls, and therefore the speed of the belt may need to be adjusted to accommodate differing speeds of other components in the system. The use of the variable speed motor 206 will permit this accommodation.

F. Dough Unloading

Figure 21:
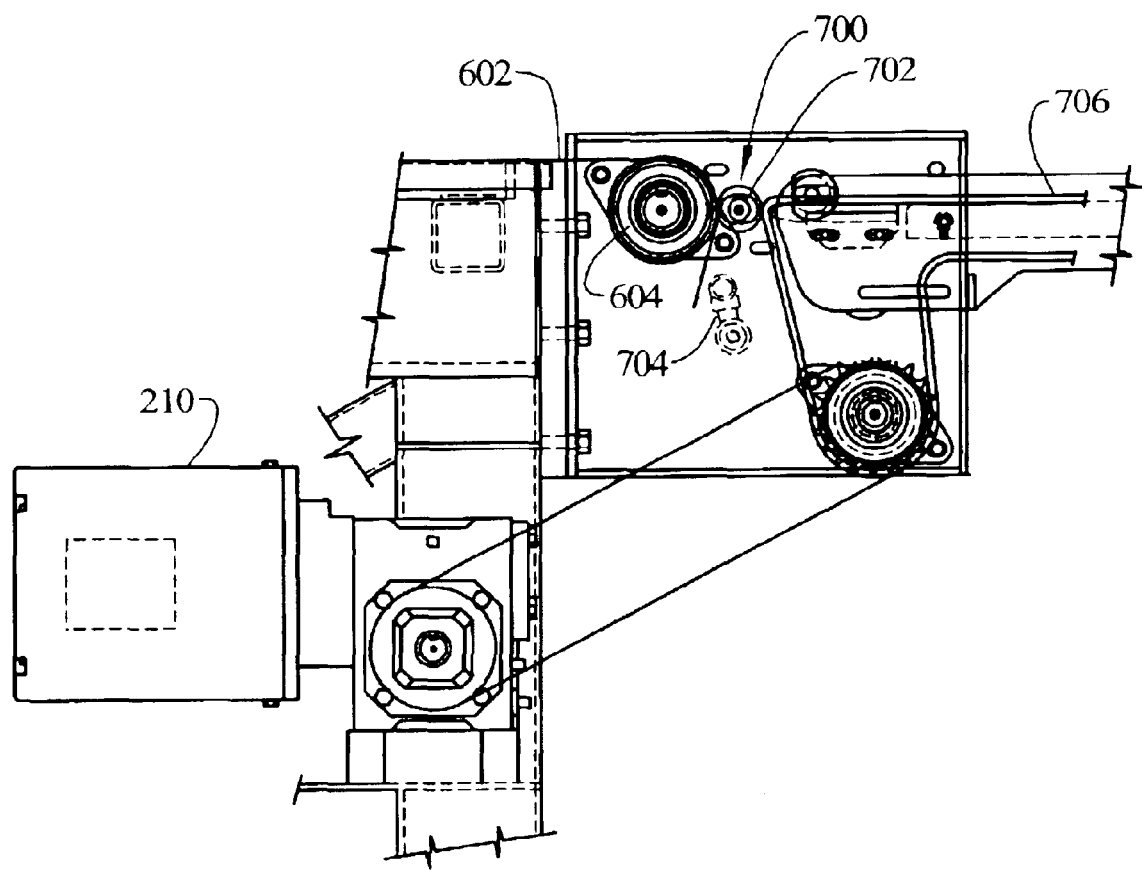
FIG. 21 is a partial side elevational view of the discharge area for the press belt.

As seen in FIG. 21, when the flattened dough pieces pass over roller 604 where the belt 602 changes direction to a downwardly direction, the dough pieces are engaged by an unloading system 700 where the undersides of the now flattened dough pieces are engaged by a rotating roller 702. This roller 702 may be in the form of a nylon brush which is rotated with a tangential surface speed maintained substantially equal to the surface speed of the belt 602 to avoid damaging the flattened dough pieces. Optionally, an air jet device 704 may be provided to direct a curtain or series of jets of air to the underside of the flattened dough pieces. Preferably the roller 702 is positioned directly adjacent to the roller 604 to prevent or minimize any gap for the flattened dough pieces to drop into. The air jets 704 should be directed into the space between the roller 604 and the roller 702 both to help separate the dough pieces from the belt 602 and to help support the dough pieces as they are suspended between the roller 604 and the roller 702. When the roller 702 is provided in the form of a nylon brush with nylon bristles, the air jet is able to pass through the bristles, thereby allowing the roller 702 to be positioned with the bristles in contact with the belt 602 passing over the roller 604, to minimize the gap.

A discharge conveyor belt 706 is provided on the opposite side of the roller 702 from the roller 604 to immediately pick up and carry the flattened dough pieces away from the press belt 602. The motor 210 is used to drive the outfeed conveyor belt 706 as well as the roller 702 and the speed of the motor 210 is controlled to maintain the speed of the discharge conveyor belt 706 substantially equal to the speed of the press belt 602. The discharge conveyor belt 706 extends over to an infeed conveyor of the oven 112 so that the flattened dough pieces are carried on into the oven for baking as described earlier.

G. Splicer Press

During the operation of the reciprocating press 400 the press belt 602, which is at least partially formed of plastic, such as Teflon, is subject to wear due to the continuous high pressure pressing of the press platens 426, 430. A regular part of the maintenance and servicing of the press includes the replacement of the belt 602 which, in previous presses, has required the disassembly of several components in order to release the tension on the belt as well as to provide an accessible path for the continuous belt to be laterally moved off of the press. This replacement operation typically required many hours to complete.

Figure 16:
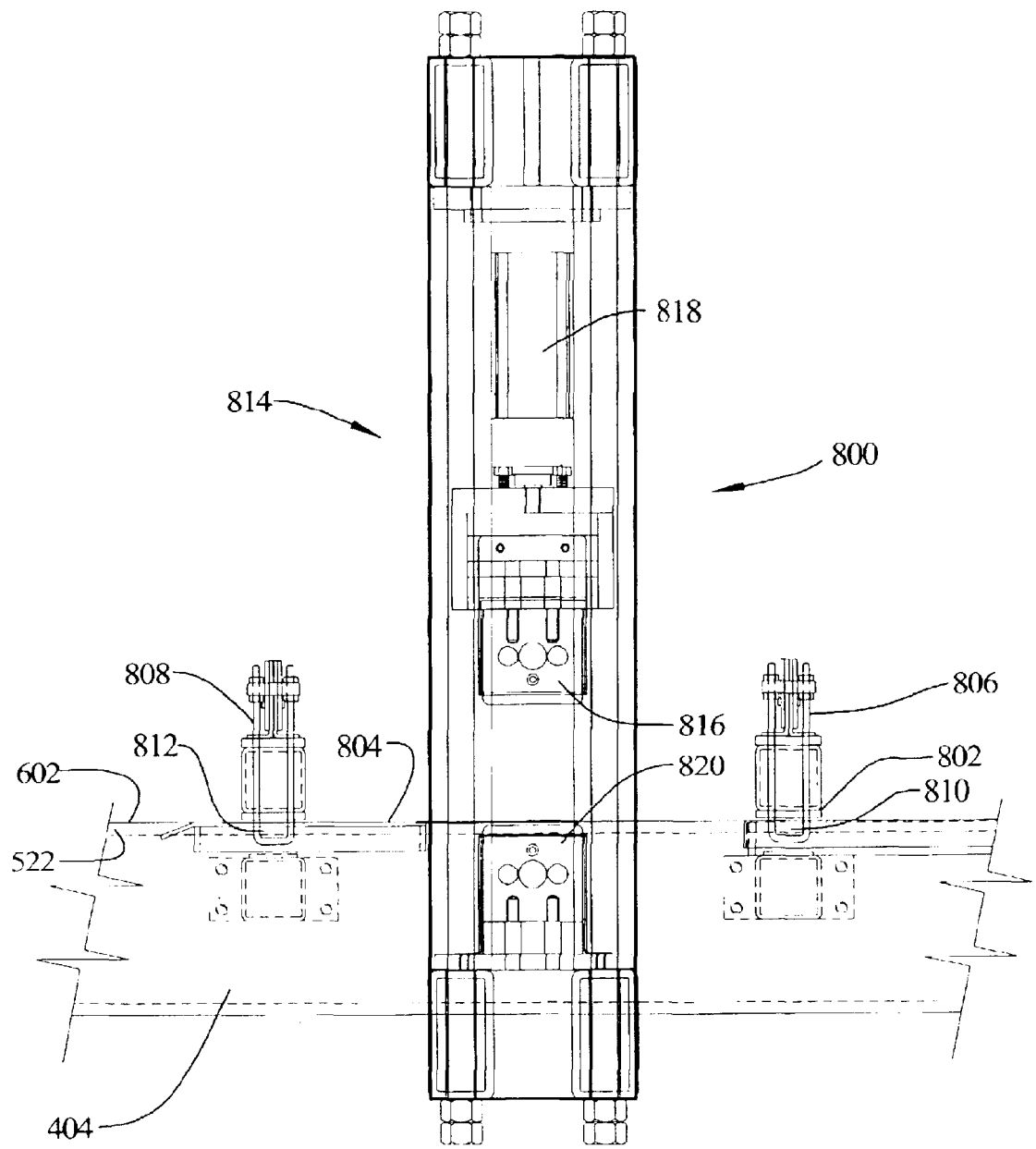
FIG. 16 is a side elevational view of the hot splice press used on the press of FIG. 3.

An optional arrangement, as shown in FIG. 16, is provided in the form of a splicing press system 800 which can be located in the area of the deck 522. The splicing press system 800 includes a pair of spaced apart hold down bars 802, 804 which extend laterally across the width of the belt 602 and which are provided with clamp arrangements 806, 808 engageable with clamping tabs 810, 812 secured to the press frame 404 by appropriate means, such as welding. Positioned between the two hold down bars 802, 804 is a vertically movable splice press 814 including an elongated bar 816 which extends laterally across the width of the belt 602 and which can be raised and lowered by means of hydraulic pistons 818. Positioned in the deck 522 is a lower bar 820 to engage a lower side of the belt 602. Either or both of the upper bar 816 and lower bar 820 may be provided with heating elements.

When an old belt 602 is to be replaced, the belt can simply be cut and threaded out of the press 400 once the tension roller 616 is released. A new belt 602 may be threaded around the various rollers and its free ends positioned in an overlapping manner directly between the upper bar 816 and lower bar 820 with the hold down bars 802, 804 holding the belt in place. The ends of the belt are then thermally welded together by pressing the upper bar 816 and lower bar 820 together with a sufficient pressure provided by the hydraulic pistons 818 and heat is applied at an appropriate temperature for a sufficient length of time so as to thermally melt the Teflon® belt, thus forming an endless belt. The upper bar 816 and lower bar 820 are then moved away from one another and the hold down bars 802, 804 are released, the tension roller 616 is moved to re-establish the proper tension in the belt 602 and the press 400 is ready to operate. This replacement procedure reduces the time required for replacing of the belt from a time measured in hours to a time measured in minutes.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A press for flattening dough pieces comprising:

a main frame supportable on a floor of a workplace;

a sub frame supportable by said main frame;

adjustment mechanisms positioned between said sub frame and said main frame to permit leveling and adjustment of said sub frame relative to said main frame;

attachment mechanisms for securing said sub frame to said main frame following adjustment of said sub frame relative to said main frame;

a conveyor belt formed at least partially of a plastic material movably carried on at least one of said frames and presenting an upper horizontal surface along at least a portion of its length;

at least one upper and one lower, vertically opposed, movable platens carried on at least one of said frames; both of said platens being movable in a longitudinal horizontal direction parallel with a moving direction of said upper horizontal surface of said belt;

said upper one of said platens being movable in a vertical direction toward and away from said conveyor belt;

a linear actuator drivingly connected to said two movable platens;

a first servo motor drivingly connected to said linear actuator;

a carriage to which said two movable platens are mounted;

at least two linear guide rods supporting said carriage for linear movement;

a loading system for loading dough balls onto said moving upper surface of said conveyor belt;

said loading system comprising a transport mechanism arranged to receive dough balls in a sequential stream and to deliver said dough balls to said moving conveyor belt at a speed equal to a speed of said upper surface of said conveyor belt;

said transport mechanism comprising a drop tube having an upper opening for receiving said sequential stream of dough balls, a pocket wheel positioned below an open bottom end of said drop tube and above said upper surface of said conveyor belt, said pocket wheel having a plurality of depressions in an outer circumference thereof to receive dough balls from said drop tube, and a second servo motor drivingly connected to said pocket wheel; and a belt splicing hot press carried on at least one of said frames operatively engageable with said belt to splice together severed ends of said belt to form a continuous endless belt.

2. A press according to claim 1, including a control for receiving a signal indicative of a speed of said upper surface of said conveyor belt and for generating a signal to said second servo motor to control a speed of said second servo motor so that said dough balls carried in said depressions of said pocket wheel are delivered to said upper surface of said conveyor belt at a said speed of said upper surface.

3. A press according to claim 1, including belt hold down clamps secured to one of said frames and engageable with said upper surface of said belt.

4. A press according to claim 1, wherein said belt splicing hot press comprises a vertically movable upper platen having a heating element therein and engageable with said upper surface of said belt and a stationary lower platen having a heating element therein and engageable with a lower surface of said belt.

5. A press according to claim 1, including a support frame for said loading system, said support frame being mounted on wheels and being movable relative to said main frame.

6. A press according to claim 1, including an arch style H frame carried on said carriage for supporting said upper platen.

7. A press according to claim 6, wherein said H frame carries a hydraulic cylinder with a vertically movable piston.

8. A press according to claim 7, wherein said movable piston includes an adjustable hard stop mechanism for preventing movement of said piston beyond a preselected downward position.

9. A press according to claim 1, including a removable free form die plate secured to a lower face of said upper platen.

10. A press according to claim 9 including a quick release retaining mechanism for securing said die plate to said upper platen.

11. A press for flattening dough pieces comprising:

a main frame supportable on a floor of a workplace;

a sub frame supportable by said main frame;

adjustment mechanisms positioned between said sub frame and said main frame to permit leveling and adjustment of said sub frame relative to said main frame;

attachment mechanisms for securing said sub frame to said main frame following adjustment of said sub frame relative to said main frame;

an endless conveyor belt movably carried on at least said sub frame and presenting an upper horizontal surface along at least a portion of its length;

at least one movable platen carried on at least one of said frames and positioned to compressingly engage said conveyor belt.

12. A press according to claim 11, wherein said at least one movable platen comprises two movable platens and both of said platens being movable in a longitudinal horizontal direction parallel with a moving direction of said upper horizontal surface of said belt and at least one of said platens being movable in a vertical direction.

13. A press according to claim 11, wherein said adjustment mechanisms comprise jack screws extending between said main frame and said sub frame at a plurality of positions.

14. A press according to claim 11, wherein said attachment mechanisms comprise a plurality of threaded fasteners.

15. A press for flattening dough pieces comprising:

a frame supportable on a floor of a workplace;

an endless conveyor belt movably carried on said frame and presenting an upper horizontal surface along at least a portion of its length;

at least one movable platen carried on said frame;

a loading system for loading dough balls onto said moving upper surface of said conveyor belt;

said loading system comprising a transport mechanism arranged to receive dough balls in a sequential stream and to deliver said dough balls to said moving conveyor belt at a speed substantially equal to a speed of said upper surface of said conveyor belt.

16. A press according to claim 15, wherein said transport mechanism comprises a drop tube having an upper opening for receiving said sequential stream of dough balls, a pocket wheel positioned below an open bottom end of said drop tube and above said upper surface of said conveyor belt, said pocket wheel having a plurality of depressions in an outer circumference thereof to receive dough balls from said drop tube, and a servo motor drivingly connected to said pocket wheel.

17. A press according to claim 16, including a control for receiving a signal indicative of said speed of said upper surface of said conveyor belt and for generating a signal to said servo motor to control a speed of said motor so that said dough balls carried in said depressions of said pocket wheel are delivered to said upper surface of said conveyor belt at said speed of said upper surface.

18. A press according to claim 16, including a dough ball retaining shoe positioned along a circumference of said pocket wheel.

19. A press according to claim 16, including a chute receiver and guide mounted at said upper opening of said drop tube.

20. A press according to claim 16, including a photo eye located in said drop tube for detecting the presence of a dough ball in said drop tube.

21. A press according to claim 15, including a support frame for said loading system, said support frame being mounted on wheels and being movable relative to said frame.

22. A press according to claim 21, including attachment mechanisms for securing said support frame to said frame.

23. A press according to claim 15, wherein said transport mechanism comprises a series of drop tubes, each having an upper opening for receiving part of said sequential stream of dough balls, a pocket wheel positioned below an open bottom end of said drop tubes and above said upper surface of said conveyor belt, said pocket wheel having a plurality of depressions in an outer circumference thereof to receive dough balls from said drop tubes, and a servo motor drivingly connected to said pocket wheel.

24. A press according to claim 23, including a series of guide tubes positioned between said series of drop tubes and said pocket wheel.

25. A press for flattening dough pieces comprising:
a frame supportable on a floor of a workplace;
a conveyor belt formed at least partially of a plastic material movably carried on said frame and presenting an upper horizontal surface along at least a portion of its length;
at least one movable platen carried on said frame for pressing said dough pieces against said upper surface of said belt;
a belt splicing hot press carried on said frame operatively engageable with said belt to splice together severed ends of said belt to form a continuous endless belt.

26. A press according to claim 25, including belt hold down clamps secured to said frame and engageable with said upper surface of said belt.

27. A press according to claim 25, wherein said belt splicing hot press comprises a vertically movable upper platen having a heating element therein and engageable with said upper surface of said belt and a stationary lower platen having a heating element therein and engageable with a lower surface of said belt.

\* \* \* \* \*